(12) United States Patent
Bianco

(10) Patent No.: US 10,086,657 B2
(45) Date of Patent: Oct. 2, 2018

(54) SYSTEM FOR AUTOMATICALLY DETERMINING VEHICLE TIRE WEAR STATUS

(71) Applicant: James S. Bianco, Suffield, CT (US)

(72) Inventor: James S. Bianco, Suffield, CT (US)

(73) Assignee: Control Module, Inc., Enfield, CT (US)

( * ) Notice: Subject to any disclaimer, the term of this patent is extended or adjusted under 35 U.S.C. 154(b) by 88 days.

(21) Appl. No.: 14/592,204

(22) Filed: Jan. 8, 2015

(65) Prior Publication Data

US 2016/0159165 A1     Jun. 9, 2016

Related U.S. Application Data

(60) Provisional application No. 62/000,289, filed on May 19, 2014.

(51) Int. Cl.
| | |
|---|---|
| *B60C 11/24* | (2006.01) |
| *G08G 1/017* | (2006.01) |
| *G06K 7/10* | (2006.01) |
| *G07F 13/00* | (2006.01) |

(52) U.S. Cl.
CPC ........ *B60C 11/243* (2013.01); *G06K 7/10009* (2013.01); *G06K 7/10356* (2013.01); *G06K 7/10366* (2013.01); *G07F 13/00* (2013.01); *G08G 1/017* (2013.01)

(58) Field of Classification Search
CPC ......... G01B 11/245; G01B 5/18; B60C 11/24; B60C 11/243; B60C 11/246
See application file for complete search history.

(56) References Cited

U.S. PATENT DOCUMENTS

| | | | | |
|---|---|---|---|---|
| 3,183,481 | A | * | 5/1965 | McCrory ................. G01B 5/18 33/203.11 |
| 3,740,710 | A | * | 6/1973 | Weintraub ............... G01B 7/06 209/604 |
| 3,899,917 | A | * | 8/1975 | Kisbany ................... G01N 3/56 451/254 |
| 4,195,413 | A | * | 4/1980 | Haraguchi ............... G01B 7/26 33/501 |
| 4,631,831 | A | * | 12/1986 | Bacher .................. G01B 11/22 33/558 |

(Continued)

*Primary Examiner* — Natalie Huls
(74) *Attorney, Agent, or Firm* — Alix, Yale & Ristas, LLP

(57) ABSTRACT

A system involves the use of one or more sensor pins which generate a binary output to determine the position of the tire on the sensor module, and if the depth of the tire tread meets the recommended depth for safe operation. The vehicle drives over two linear sensor modules, one for the driver side tires and the other for the passenger side tires. As the tires pass over the sensor modules, the sensor pins on/off status is recorded and analyzed to determine whether the tires are centered on the module and whether the depth of the threads meet or exceed the recommended depth for safe operation. When both front and rear tires have passed over the sensor modules, the tire statuses will be displayed on a tire status indicator, and a receipt with the tire status will be printed for the vehicle. When used with fleet management systems, the vehicle identification and the tire statuses will also be sent to a data center for further processing.

15 Claims, 25 Drawing Sheets

(56) References Cited

U.S. PATENT DOCUMENTS

| | | | | |
|---|---|---|---|---|
| 4,894,920 A | * | 1/1990 | Butler | G01B 5/18 |
| | | | | 33/203.11 |
| 5,365,668 A | * | 11/1994 | Canovas | G01B 7/28 |
| | | | | 33/203.11 |
| 6,034,676 A | * | 3/2000 | Egan | G01B 21/18 |
| | | | | 701/31.4 |
| 7,797,995 B2 | * | 9/2010 | Schafer | B60C 11/24 |
| | | | | 73/146 |
| 8,111,387 B2 | | 2/2012 | Douglas et al. | |
| 8,186,215 B2 | | 5/2012 | Douglas et al. | |
| 8,625,105 B2 | * | 1/2014 | Pryce | G01B 11/245 |
| | | | | 356/139.09 |
| 8,770,022 B2 | | 7/2014 | Douglas et al. | |
| 2013/0220708 A1 | * | 8/2013 | Kim | G01G 23/3735 |
| | | | | 177/3 |
| 2013/0271574 A1 | | 10/2013 | Dorrance et al. | |
| 2014/0262565 A1 | | 9/2014 | Stieff et al. | |
| 2014/0267699 A1 | | 9/2014 | Dorrance et al. | |
| 2015/0095156 A1 | * | 4/2015 | Sauerbrey | H04L 67/303 |
| | | | | 705/14.58 |
| 2016/0280189 A1 | * | 9/2016 | Tokusa | B60S 3/042 |

\* cited by examiner

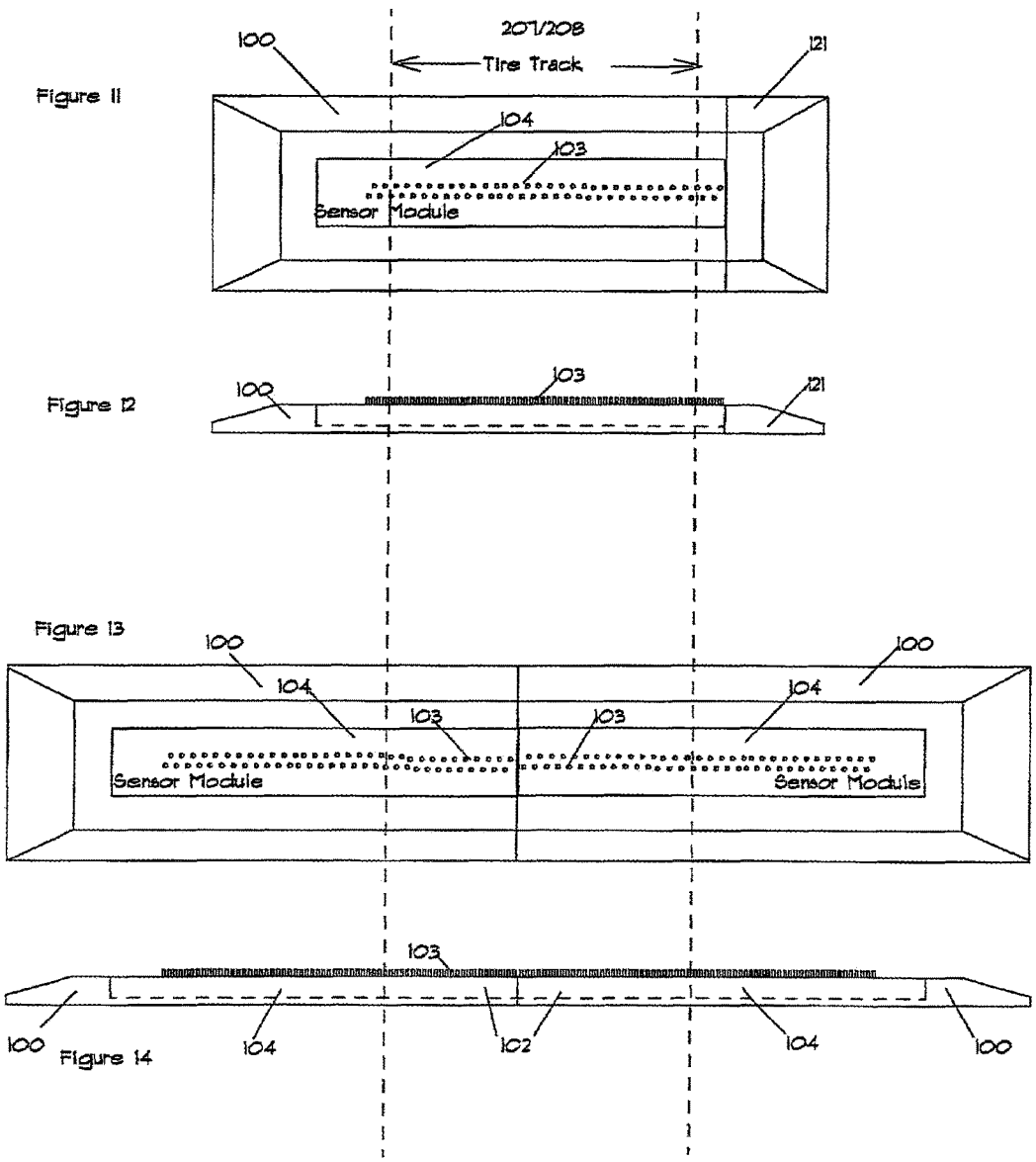

Air Compressing

Tire tread clearer

Rear tire detection

Clear data and Displays

Tire check processor module

Car tire status indicator module

Vehicle I.D. and control module

Fuel Island data terminal

Truck Tire status indicator module

Tire check receipt printer

Transportation truck tire check system

SYSTEM FOR AUTOMATICALLY DETERMINING VEHICLE TIRE WEAR STATUS

CROSS-REFERENCE TO RELATED APPLICATION

This application claims the priority of U.S. Provisional Application No. 62/000,289, filed on May, 19, 2014, the entirety of which is incorporated herein by reference.

BACKGROUND

This disclosure relates to automatically evaluating the wear characteristics of automobile and truck tires.

The average vehicle owner rarely checks the wear, tear, and tread depth of his or her vehicle tires and is typically prone to wait until there is a flat or a defective tire occurs. It is fully understood that the depth of the grooves on the tire greatly affect the performance of the tire and consequently the vehicle itself. As the groove depth is reduced due to wear and tear, the tires become less stable when they encounter water, ice or snow.

The problem of tire wear is even more important when applied to fleet vehicles, such as police cars, due to being exposed to continuous high speeds and severe maneuvers. Gone unchecked, a tire failure in these circumstances could lead to serious consequences.

Car rental agencies are also exposed to large liabilities, for renting a vehicle with worn tires. Therefore, these tires must be checked each time the vehicle is rented. The agencies are also exposed to tire thieves, which rent a car, exchange its new tires for a set of old ones, and return the vehicle to the rental agency. If the tires are not checked immediately when the vehicle is returned, it would become difficult to identify the culprits. If that vehicle is rented to a new customer with the worn tires, the rental company would potentially be liable for damages, should an accident occur due to the worn tires.

The problem of worn tires also applies to heavy duty truck transportation. Because of their large size and restricted accessibility, checking truck tires is often overlooked or ignored. Not checking the tires could lead to serious consequences, should a tire fail while transporting heavy loads on public highways.

SUMMARY

The present disclosure relates to multiple systems for easily checking tire wear with little or no effort from the driver, other than driving the vehicle through the tire evaluation station.

A key component is a pins sensor module, which deploys the use of pins sensors and return springs. Pins which are used to determine the depth of the tire tread basically functions as an on-off switch. The pin length is important. However, once the sensor module is installed, it never needs calibration. The sensor module is designed to operate for many years in the harshest environments.

An automatic tire checking station, in which the vehicle is simply driven over two pin sensing modules, is comprised of an array of pins sensing devices, such as but not limited to, a spring-loaded pin with a contact surface, held in place by a pin guide block, a printed circuit board, and a wire spring connected to a ground bar. When no downward pressure is applied to the end of the sensor pin, the contact surfaces of the sensor pin are pressed against the contact surfaces of the printed circuit card, grounding the input voltage to a scanning microprocessor and generating a zero state input to the scanning microprocessor. When pressure is applied to the end of the sensor pin, the contact surfaces of the sensor pins are separated from the contact surfaces of the printed circuit card, removing the ground from the scanning microprocessor digital input and generating a one state to a digital input. Each sensor pin printed circuit contact is connected to a separate pull-up resistor and digital input on a scanning microprocessor. At least two or more sensor pins, but preferably a hundred or more, are arranged in a row and mounted as close as physically possible to each other to form a pin sensing area. When it is not possible to place the sensing pins as close as desired, a second row of pins may be installed behind and in parallel to the first row. The second set of pins is shifted to align with the center of the first row of pins, thus increasing the sensor resolution.

When a vehicle tire is driven over the sensor array that is wider than the tire itself, some sensor pins will not be under the tire and therefore not depressed. Some sensor pins that are under the tire tread will be depressed to the surface and some sensor pins will be located under the grooves in the tires. When the tire grooves meet or exceed the recommended safe depths, the sensor pins will not be pressed, therefore generating a zero input to the scanning processor for these pin locations. When the vehicle detector senses the presence of a vehicle, the scanning microprocessor will store the status and location of each of the sensor pins. When the scanning microprocessor detects that a tire is no longer pressing on the sensor pins, it transmits to the data processor the status and location of each sensor pin. Two sensor arrays are provided, one for the driver side and one for the passenger side. Both pin sensing modules transmit their pin status and locations to the data processor. As long as a vehicle is detected, the data processor will wait for additional data from the pins sensing modules that is generated by the second set of tires going over the modules.

When the vehicle is no longer detected and all of the data from the pin sensor modules have been transmitted to the data processor, the data processor, based on the sensor pins status and locations, will determine if the tires were correctly located on the pin sensor modules and the tread depth meets or exceeds the safety standards. The status of each tire will preferably be presented on a visual display in the form of green light indicating tire passed inspection, and red light indicating that the tire should be visually inspected. A visual indicator is also provided to alert the driver that the tires were not located properly on the sensor modules and that it is necessary to drive the vehicle over the sensors again. The data processor will also provide a printed receipt for the driver with the date, time, location and status of each tire. In addition, the data may also be sent to a central data processor via the internet.

BRIEF DESCRIPTION OF THE DRAWINGS

FIG. 11 is an annotated top plan view of a single tire check sensor module;

FIG. 12 is an annotated side view of a single tire check sensor module;

FIG. 13 is an annotated top plan view of a dual tire check sensor module;

FIG. 14 is an annotated side view of a dual tire check sensor module;

DETAILED DESCRIPTION

Figure 1:
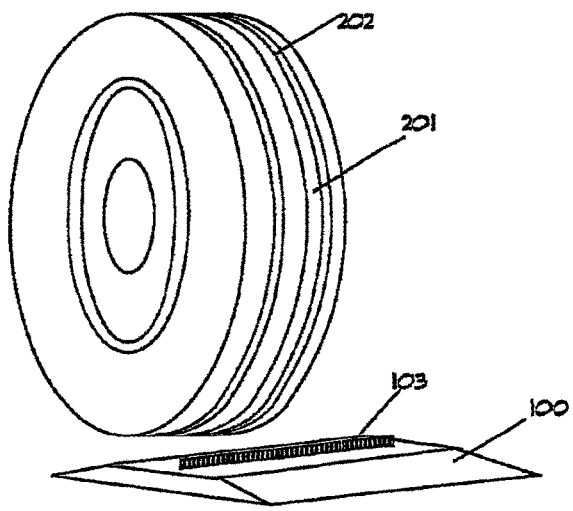
FIG. 1 is an annotated isometric view of the approach of a vehicle tire about to be checked for wear.
Figure 2:
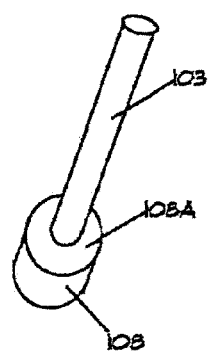
FIG. 2 is an annotated isometric view of a single tire check sensor pin.
Figure 3:
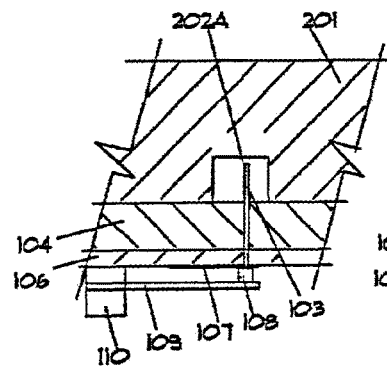
FIG. 3 is an annotated cutaway side view of a pin sensor detecting a good tread depth.
Figure 4:
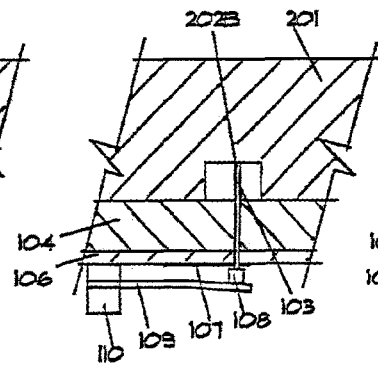
FIG. 4 is an annotated cutaway side view of a pin sensor detecting a worn tread depth.
Figure 5:
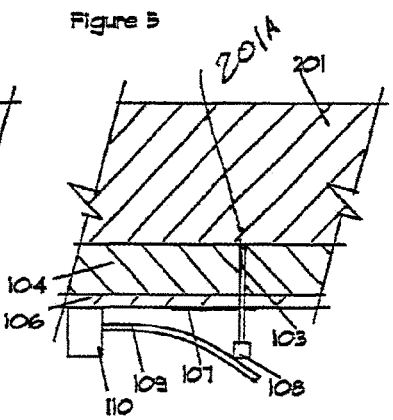
FIG. 5 is an annotated cutaway side view of a pin sensor detecting no tread depth.
Figure 6:
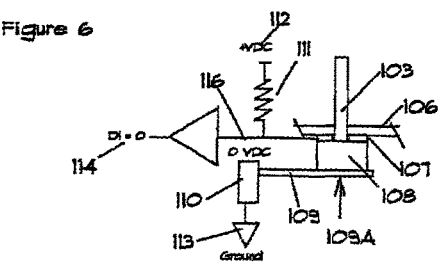
FIG. 6 is an annotated schematic diagram of a closed contact pin sensor.
Figure 7:
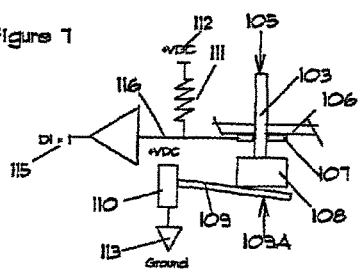
FIG. 7 is an annotated schematic diagram of an open contact pin sensor.
Figure 8:
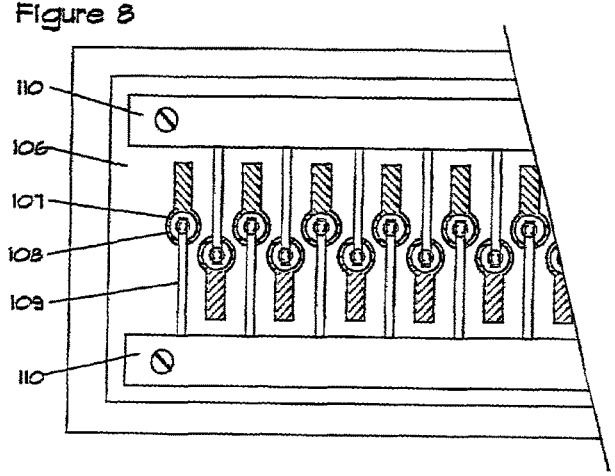
FIG. 8 is an annotated bottom view of a group of pin sensors and a section of the sensor module printed circuit card.
Figure 9:
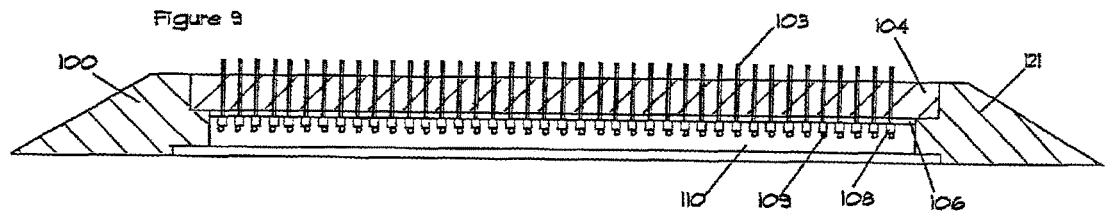
FIG. 9 is an annotated cutaway side view of a tire check sensor module.
Figure 10:
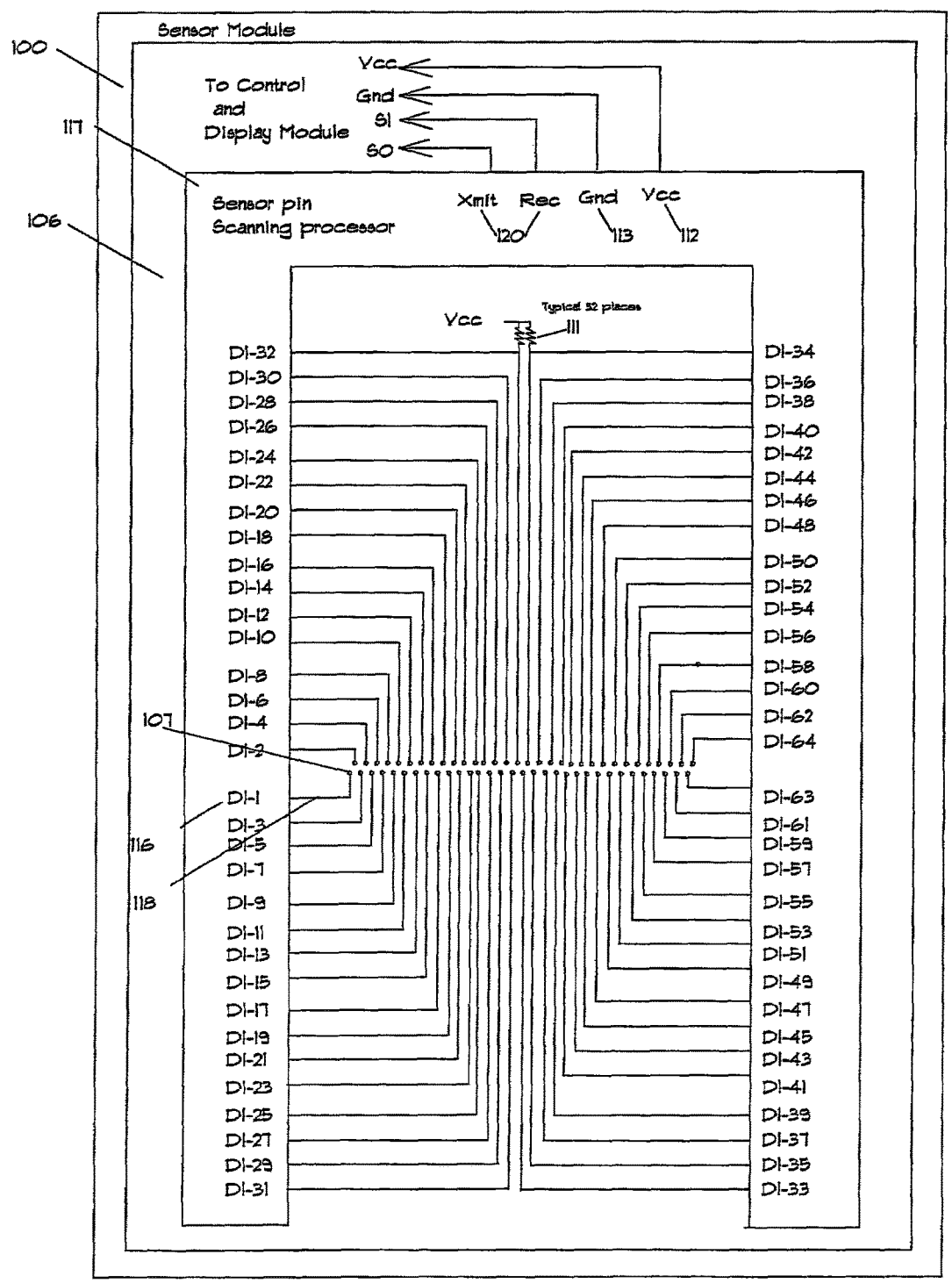
FIG. 10 is an annotated schematic diagram of a pin sensor scanning processor.

With reference to the drawings, wherein like numerals represent like parts throughout the several figures, a system automatically determines if the groove depths 202 in vehicle tires 201 are adequate for safe operation. The vehicle tire 201 is driven over a thread depth sensor module generally designated by the numeral 100. The thread depth sensor module 100 contains a row of sensor pins 103 which are held in place by the sensor pin guide block 104. The thread depth sensor pins 103 protrude from the sensor pin guide block 104 to a height that is equal to the recommended tread depth for safe tire operation. The sensor pin stop ring 108 is attached at one end to the sensor pin 103. A sensor pin stop ring 108 is made of conductive material and forms the sensor pin contact 108A. The sensor pin 103 and the attached sensor pin stop ring 108 are forced upward in the sensor pin guide block 104 by a conductive return spring 109 until the sensor pin stop ring 108A comes in contact with a printed circuit contact 107 on a printed circuit card 106. The return spring 109 is attached to a conductive ground bar 110.

When the sensor pin 103 aligns with a tire grove 202A, that meets or exceeds the recommended depth for safe operations, the sensor pin contact 108A will be connected to the circuit contact 107, grounding the input to the scanning processor digital input 116.

When the sensor pin 103 aligns with a tire tread 201A, the sensor pin contact 108A will not be connected to the circuit contact 107, removing the ground from the input to the scanning processor digital input 116.

A pull up resistor 111 is connected to a pull up voltage 112 and the scanning processor digital input 116. When the printed circuit contact 107 is grounded by the sensor pin contact 108A, a logic level zero 114 is detected for that sensor pin 103 position on the thread depth sensor module 100. When the printed circuit contact 107 is not grounded by the sensor pin contact 108A, a logic level one 115 is detected for that sensor pin 103 position on the thread depth sensor module 100.

The thread depth sensor module 100 houses a thread depth sensor assembly 101 which includes one or more sensor pins 103 held in a row by the sensor guide block 104 and passing through the sensor printed circuit card 106. Each sensor pin 103 is forced upward by a separate return spring 109 connected to a grounding bar 110. Each printed circuit contact 107 is connected to the pull up resistor 111 and the separate scanning processor digital input 116 via a connecting wire 118.

The sensor pin scanning processor 117 communicates with the tire check processor module 300 using transmit and receive signals 120.

The single thread depth sensor module 100 is formed by attaching an end bevel 121.

To increase the sensor area 207, 208, two thread depth sensor modules 100 are mounted back-to-back to form a dual thread depth sensor module 102. Two dual thread sensor modules 102 are mounted on the ground surface in the tire paths 207, 208, one for the driver side 202A and the second for the passenger side 202B. Two vehicle guideposts 226 are provided to help center the tires of vehicle 200 over the dual thread sensor module 102.

Figure 17:
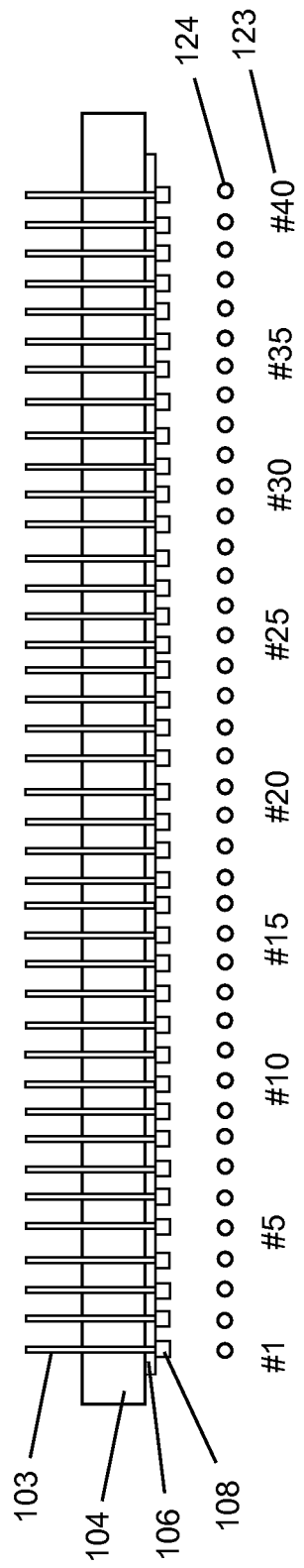
FIG. 17 is an annotated cutaway side view of a tire checking sensor module.

When a driver wishes to check the tire condition of the vehicle 200, the driver simply drives between the vehicle guidepost 226 and over the thread depth sensor modules 102A and 102B. As the vehicle 200 approaches the thread depth sensor modules 102A and 102B, the vehicle detector 302 will sense the presence of vehicle 200 before its tires 203 and 205 pass over the thread sensor module 102A and 102B (FIG. 17). At that time, all thread depth pin sensors 103 are scanned by the sensor pin scanner processor 117.

The digital inputs 116 should all be logic level zero 114. If a thread depth sensor pin is damaged or stuck in the down position, thereby causing a logic level one 115 for that position, that sensor pin 103 position will be ignored during the tire thread depth checking operation. A message will be sent to maintenance 225 alerting it of the defective sensor pin 103.

Figure 18:
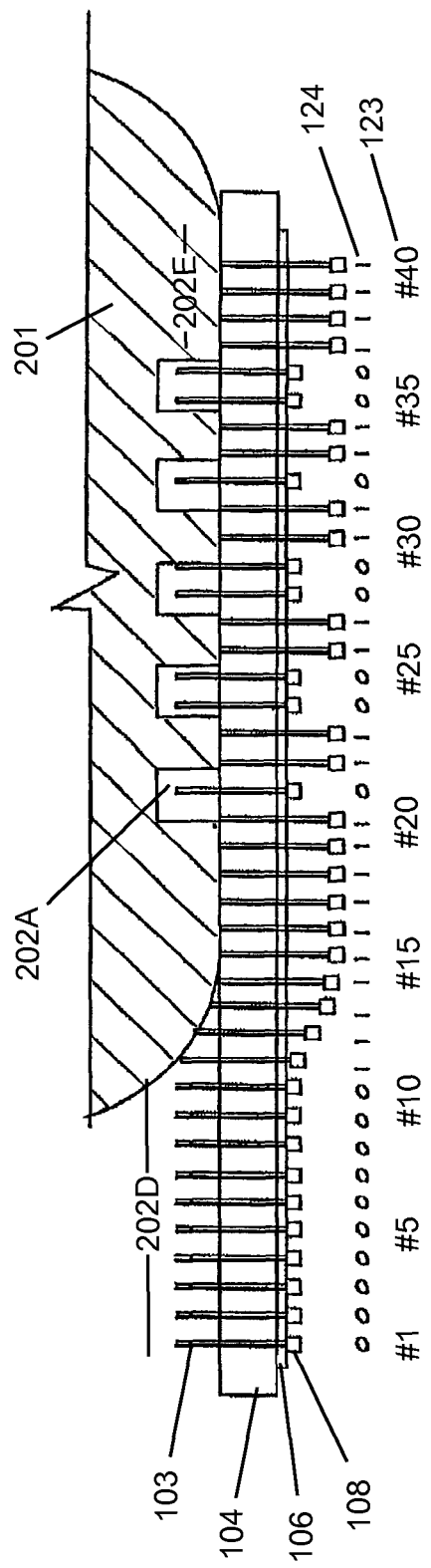
FIG. 18 is an annotated cutaway side view of a tire checking sensor module detecting an offset tire.

A vehicle tire 201 that is not centered properly passes over thread depth sensor modules 102A and 102B (FIG. 18). The lower order (1 to 10) thread depth pins 202D will be at a logic level zero and the higher order (37 to 40) thread depth pins 202E will be at a logic one 124. This unbalance will signal the tire status data processor 301 and it will alert the driver of vehicle 200 using the vehicle misalignment indicator 410 on the car tire status indicator module 400.

Figure 19:
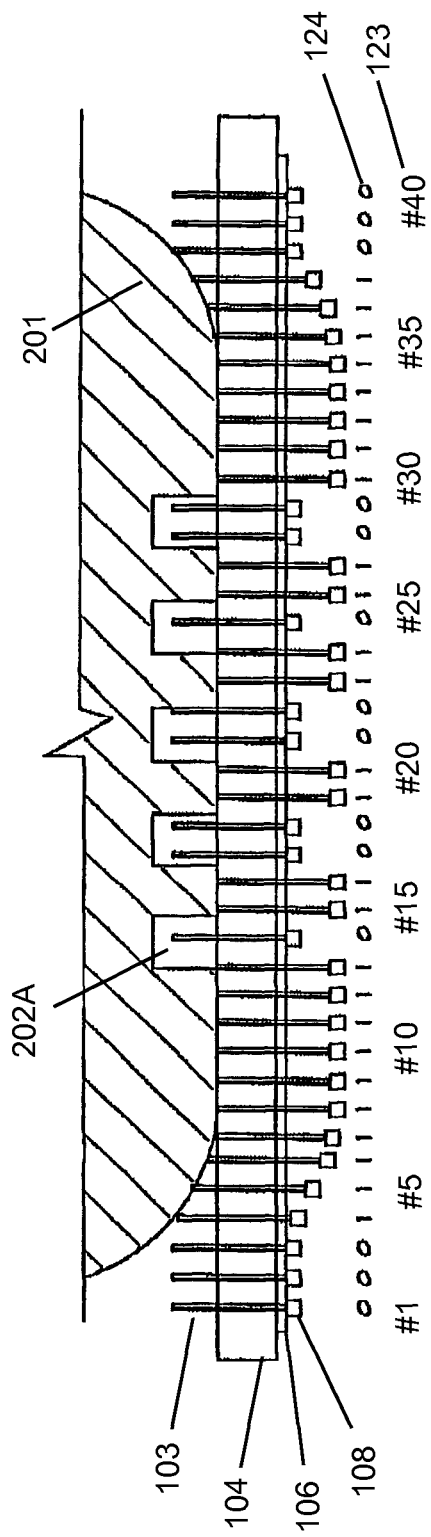
FIG. 19 is an annotated cutaway side view of a tire checking sensor module detecting a good tire tread depth.

When a properly centered vehicle tire 201 passes over thread depth sensor modules 102A and 102B (FIG. 19), the lower order (1 to 3) thread depth pins will be at a logic level zero and the higher order (41 to 40) thread depth pins are also at a logic zero 124. This balance will signal the tire status data processor 301 that the tires 203 and 205 are centered and that the thread depth sensor pins between the lower and upper order logic level zero 114 may be checked to see how many thread depth sensor pins 103 are at a logic level zero 114 and how many thread depth sensor pins 103 are at a logic level one 115.

When the thread depth sensor pins 103 with logic level zero, exceed a set percentage of the thread depth sensor pins 103 with logic level ones, the tire grooves are deep enough for safe operations. The tire status data processor 301 will alert the driver of vehicle 200 using the green tire pass indicator 402 and 404 on the car tire status indicator module 400.

Figure 20:
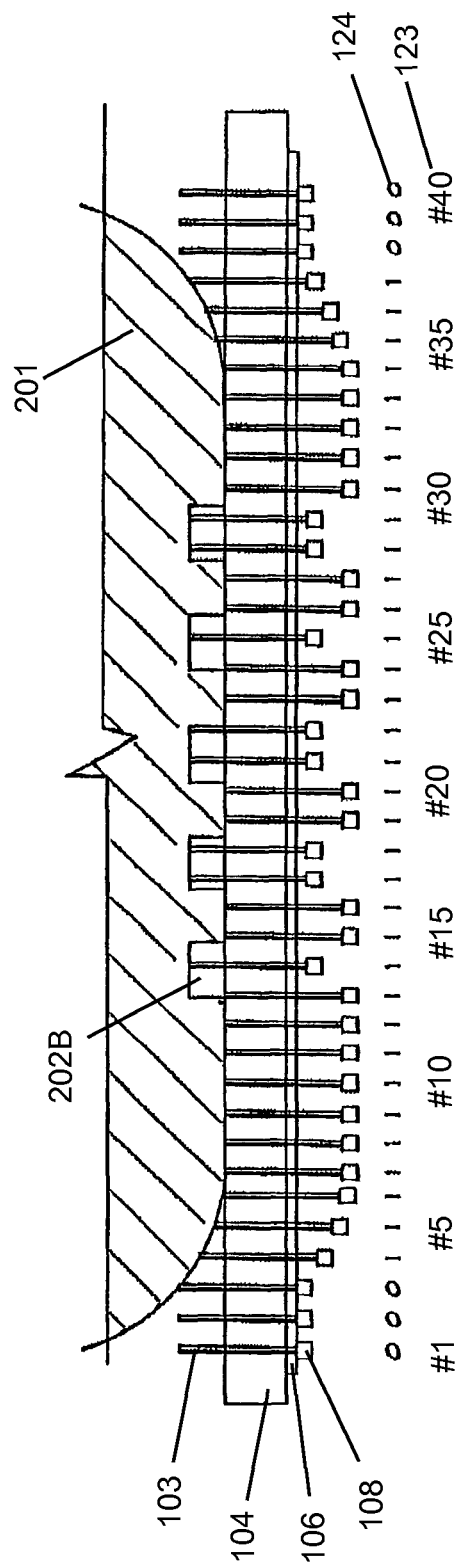
FIG. 20 is an annotated cutaway side view of a tire checking sensor module detecting a worn tire tread depth.

When the logic level zero, thread depth sensor pins 103, is less than a set percentage of the logic level ones, thread depth sensor pins 103, (FIG. 20) the tire grooves are not deep enough for safe operations. The tire status data processor 301 will alert the driver of vehicle 200 using the red check tire visual indicator 403 and 405 on the car tire status indicator module 400.

Figure 21:
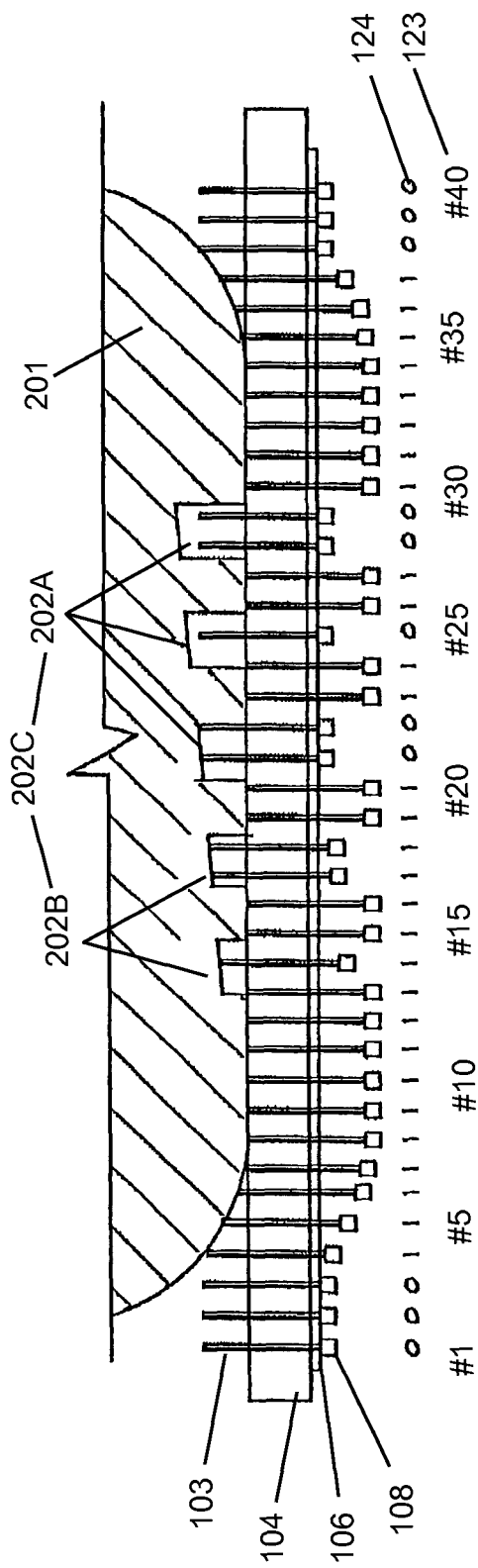
FIG. 21 is an annotated cutaway side view of a tire checking sensor module detecting a worn tire edge.

When the logic level zero thread depth sensor pins 103 are not spread evenly 202C (FIG. 21) over the width of tire thread 201, it is an indication that the tire 201 was not worn evenly and not safe for operation. The tire status data processor 301 will alert the driver of vehicle 200 using the red, check tire visual indicator 403 and 405, on the car tire status indicator module 400.

After the front tires 203, 205 on vehicle 200 exit the dual thread depth sensor modules 102A, 102B and a vehicle 200 is still detected by the vehicle detector 302, a second set of vehicle tires 204, 206 will be analyzed when they pass over the dual thread sensor modules 102A, 102B. The tire 204, 206 status will be indicated to the vehicle 200 driver, using the rear tire status indicators 404, 405, 408, 409 on the car tire status indicator module 400.

Figure 22:
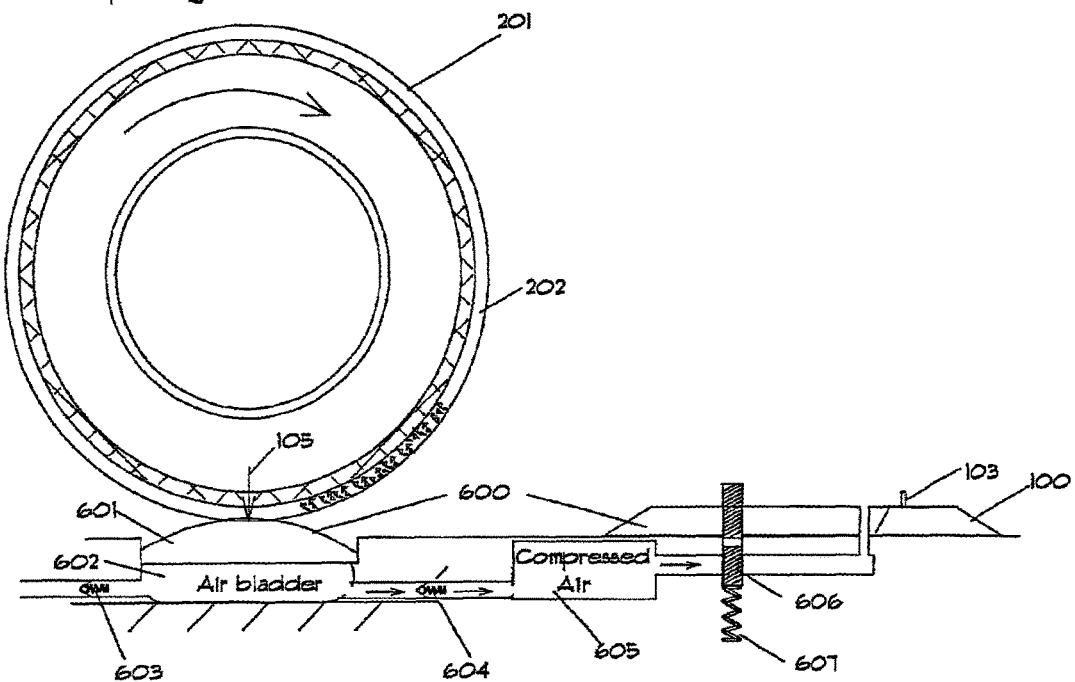
FIG. 22 is a simple elevation view of an air compressing section of a tire thread cleaning station.
Figure 23:
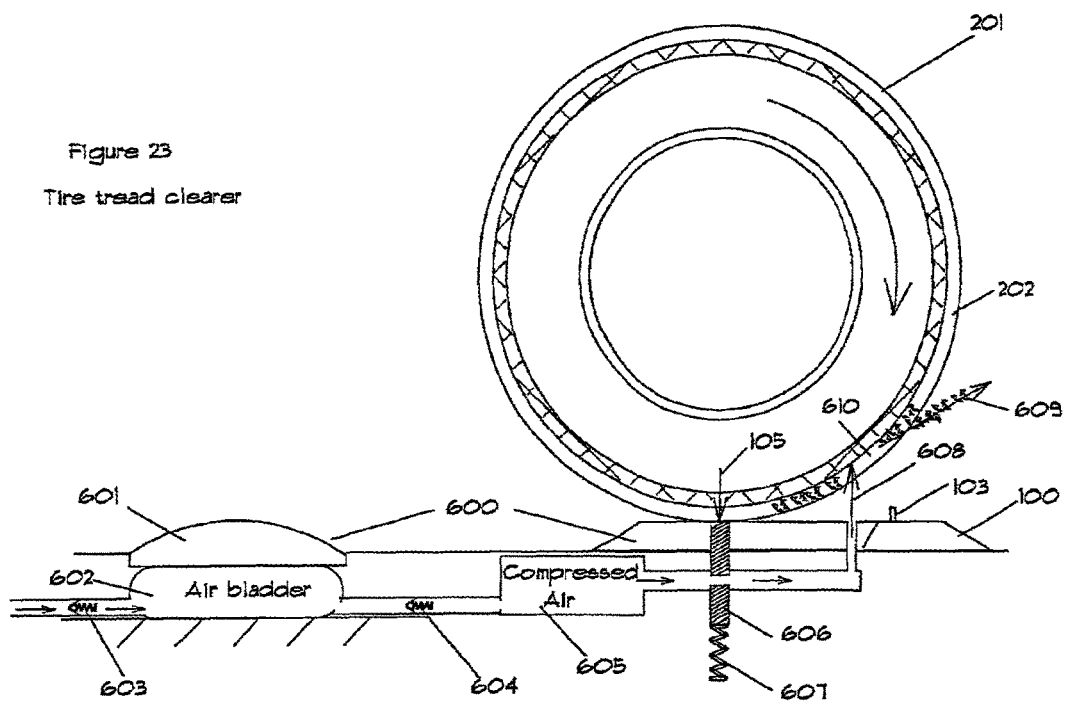
FIG. 23 is a simple elevation view of the air blast section of the tire thread cleaning station.

To insure that the grooves 202 in the tires being checked 201 are free of debris 608, a groove cleaning station 600 is incorporated into the thread depth sensor module 100 (FIG. 22). As the vehicle tire 201 approaches the thread depth sensor module 100, it presses down 105 on an air bladder plunger 601, forcing air in an air bladder 602 through the air outlet check valve 604 into the compressed air tank 605. When the vehicle tire 201 exits the air bladder plunger 601 (FIG. 23) it is allowed to raise sucking air into the bladder 602, through an inlet check valve 603. When the vehicle tire 201 presses down 105 on the air slide valve 606 and the air slide valve return spring 607, a blast of air 608 is released from the compressed air tank 605, directed at the tire groove test area 610, ejecting debris 609.

Figure 24:
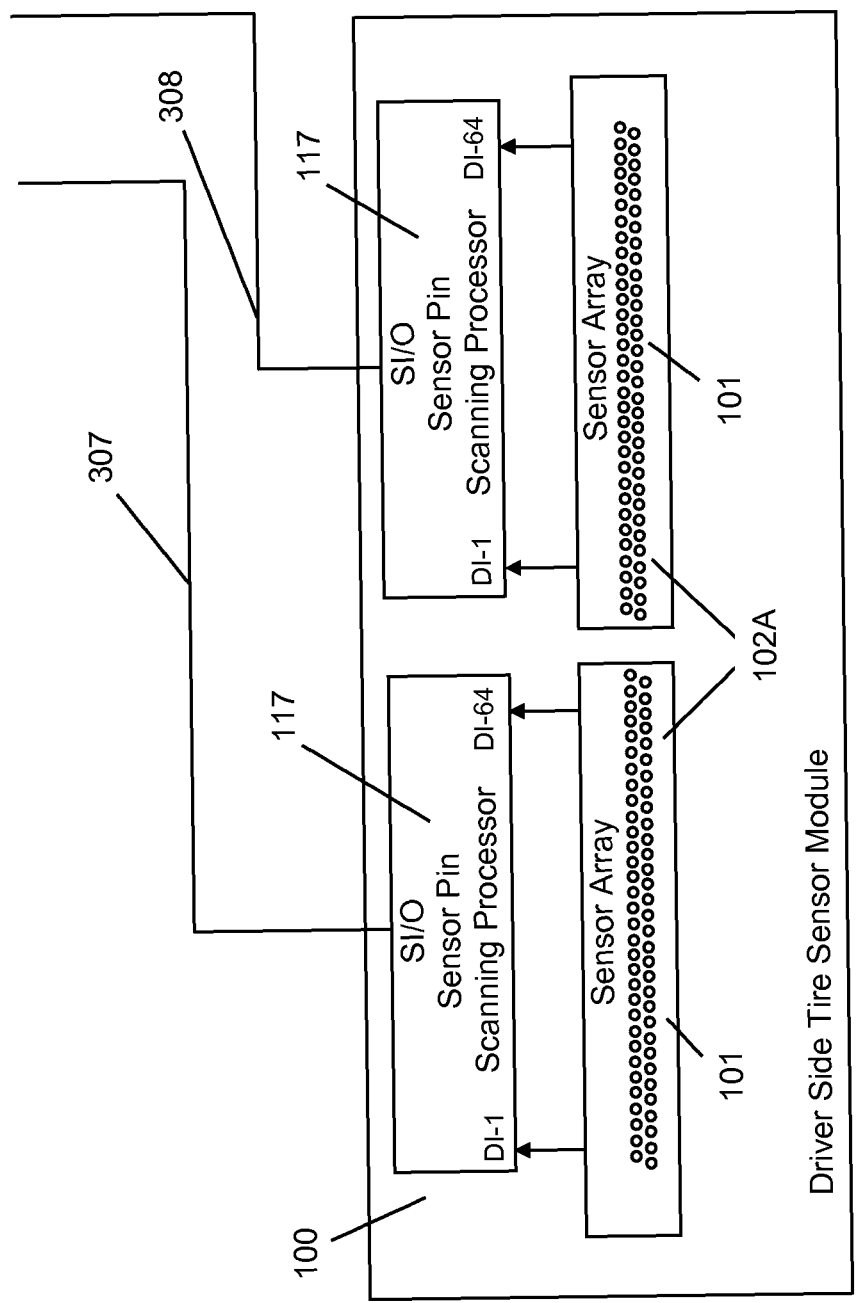
FIG. 24 is an annotated block diagram of a driver side dual tire check sensor module.
Figure 25:
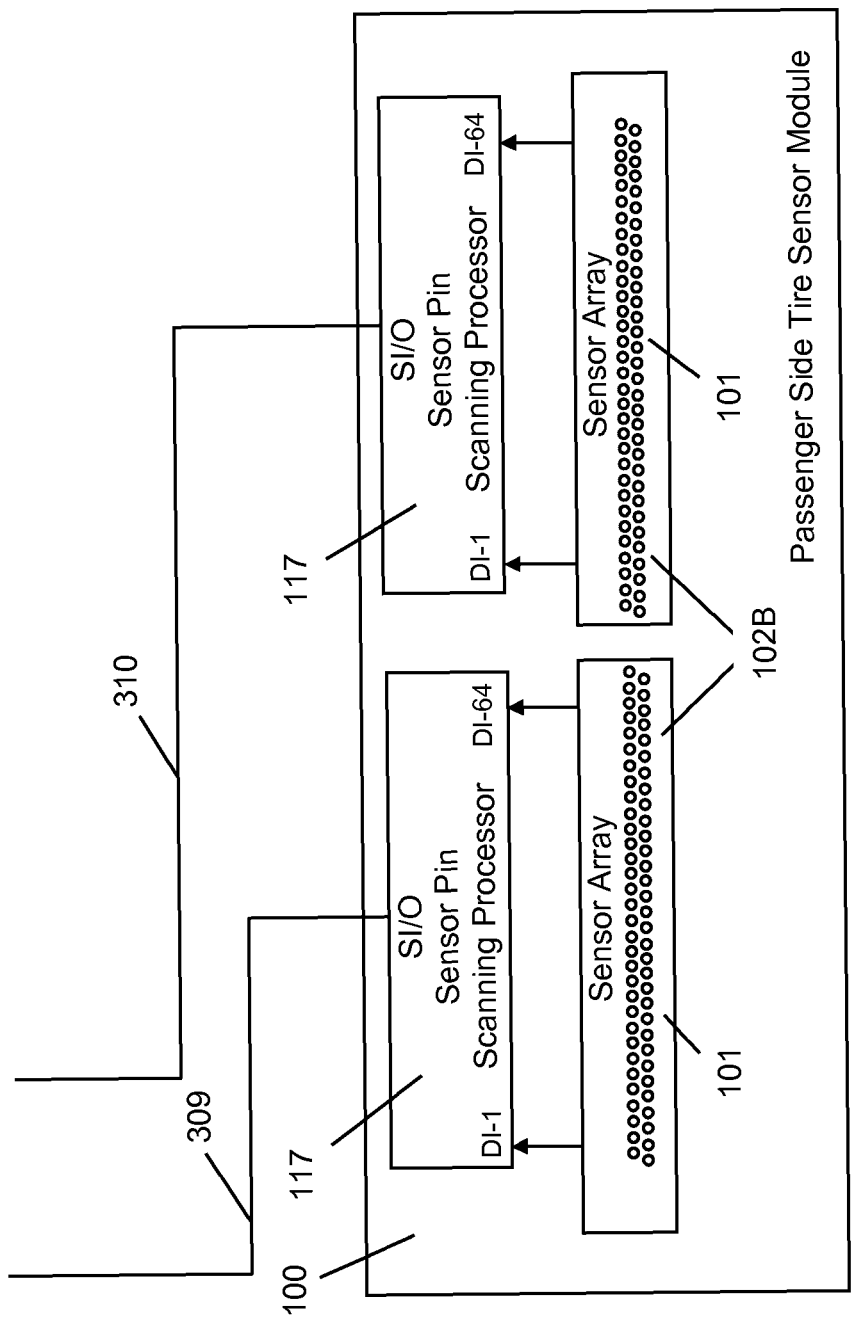
FIG. 25 is an annotated block diagram of a passenger side dual tire check sensor module.

Sensor pins 103 status data 207, 208 are sent from the driver side dual thread sensor module 102A and the sensor pins 103 status data 209, 210 are sent from the passenger side dual thread sensor module 102A to the tire status data processor 301 for tire groove depth qualification (FIGS. 24, 25).

Figure 26:
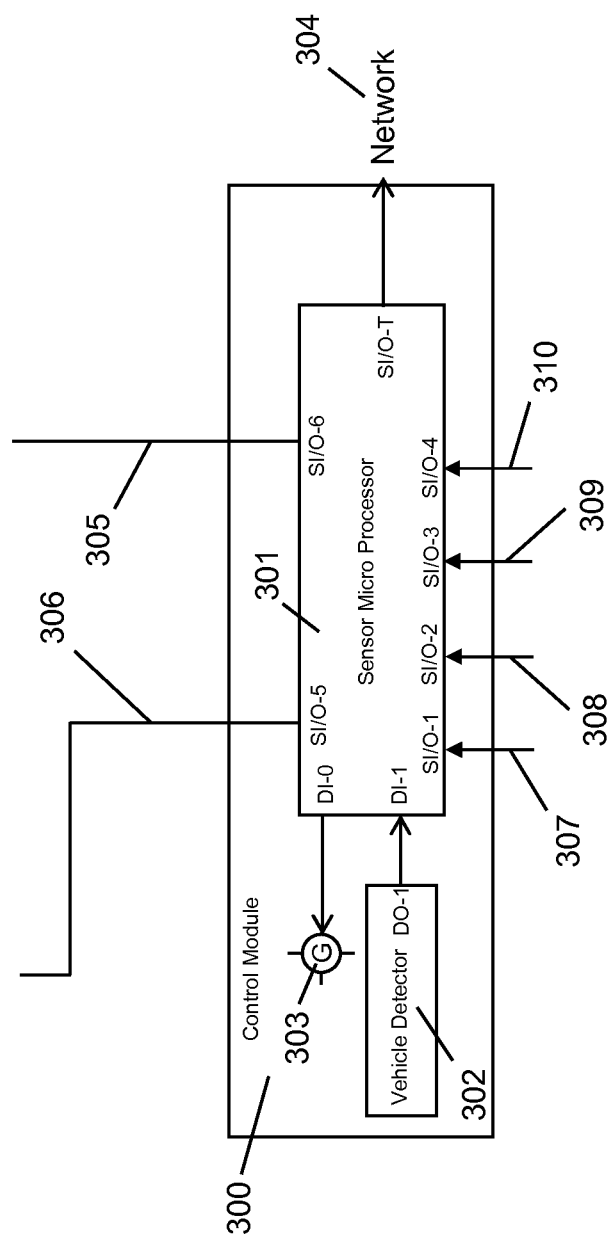
FIG. 26 is an annotated block diagram of a control module.
Figure 27:
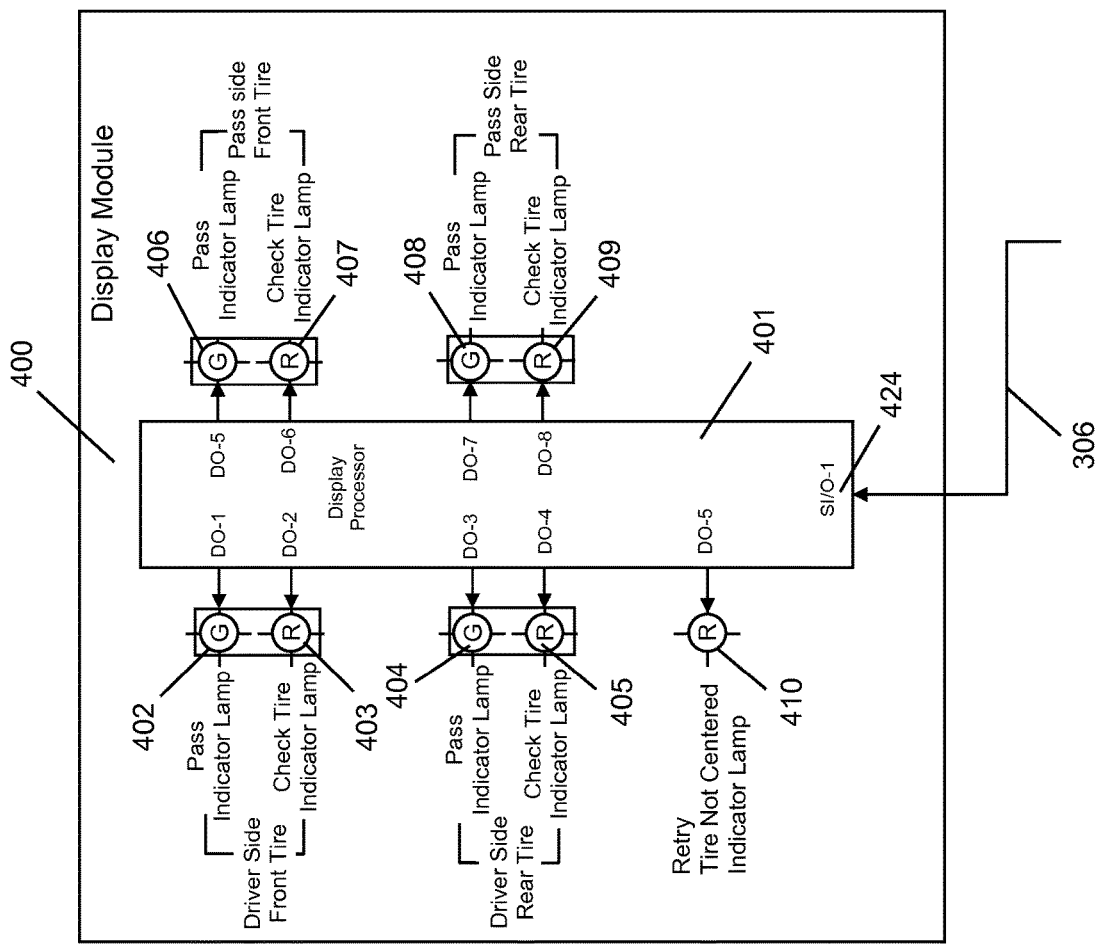
FIG. 27 is an annotated block diagram of a car tire status indicator module.
Figure 28:
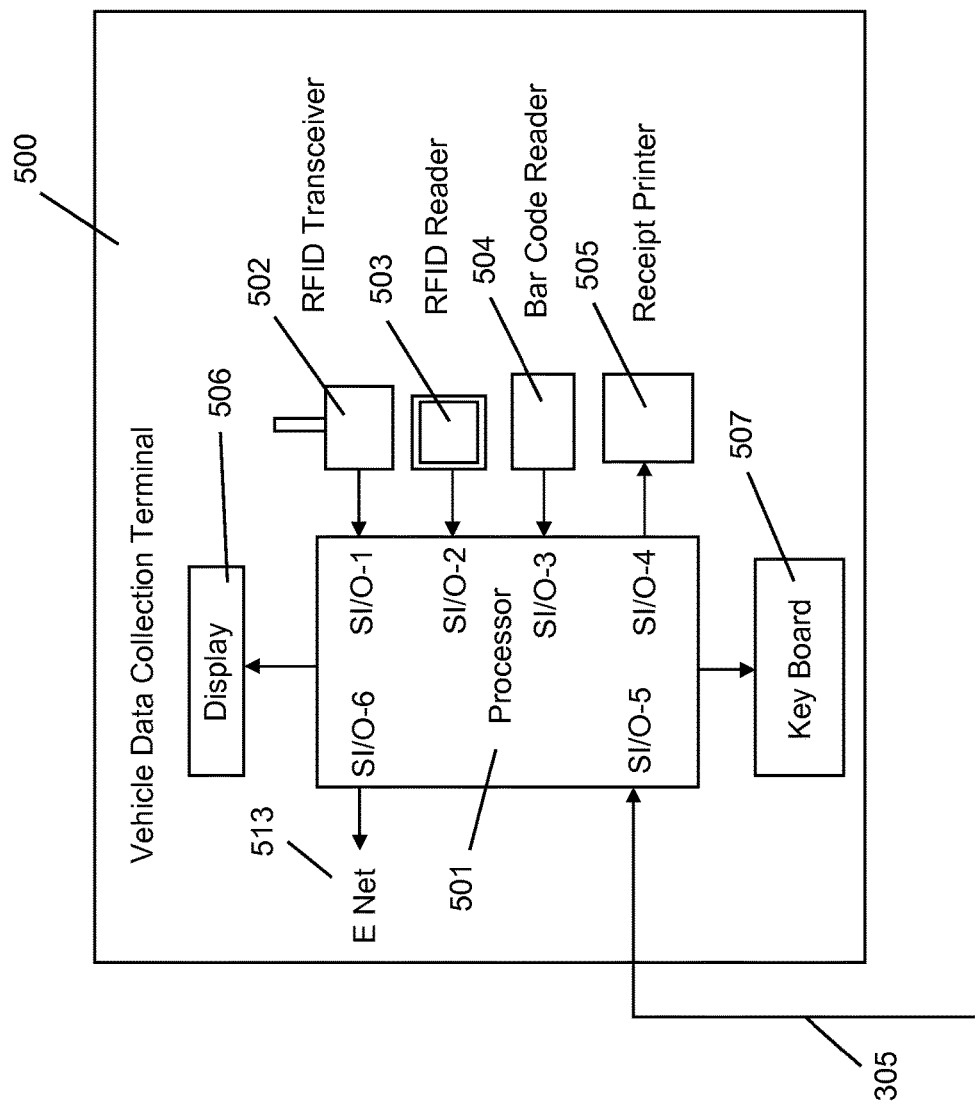
FIG. 28 is an annotated block diagram of a vehicle data collection terminal.
Figure 29:
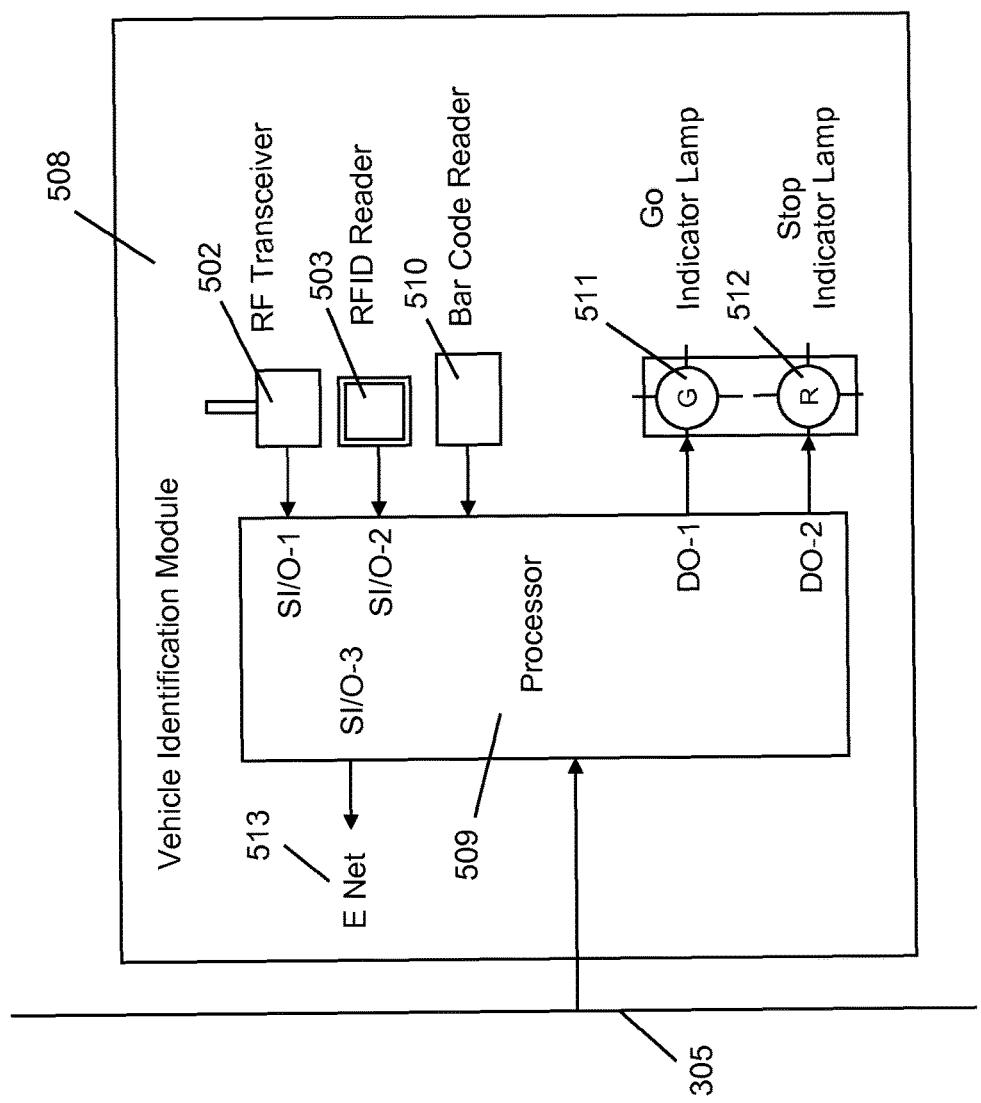
FIG. 29 is an annotated block diagram of a vehicle identification module.
Figure 30:
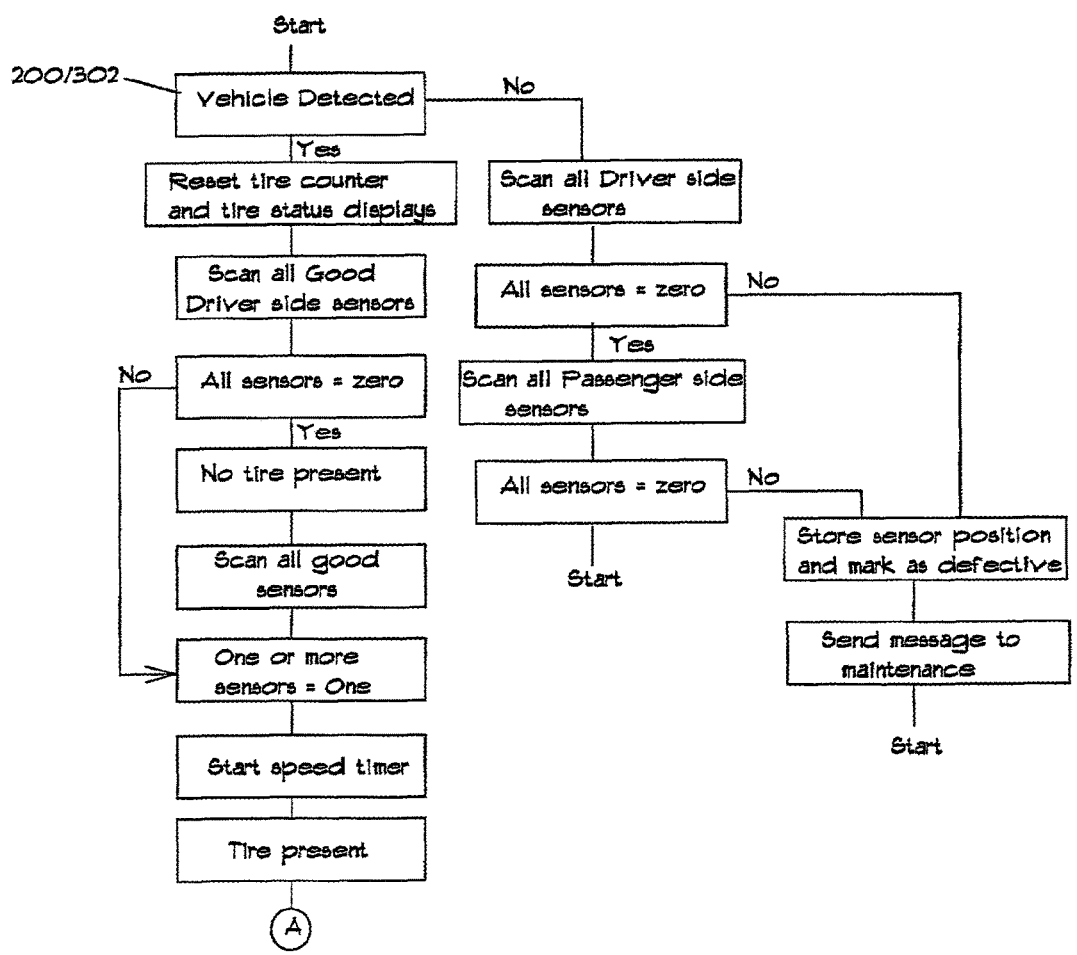
FIG. 30 is a flow chart illustrating steps and methods of an automatic system with self-test, vehicle detection, and front tire detection.
Figure 31:
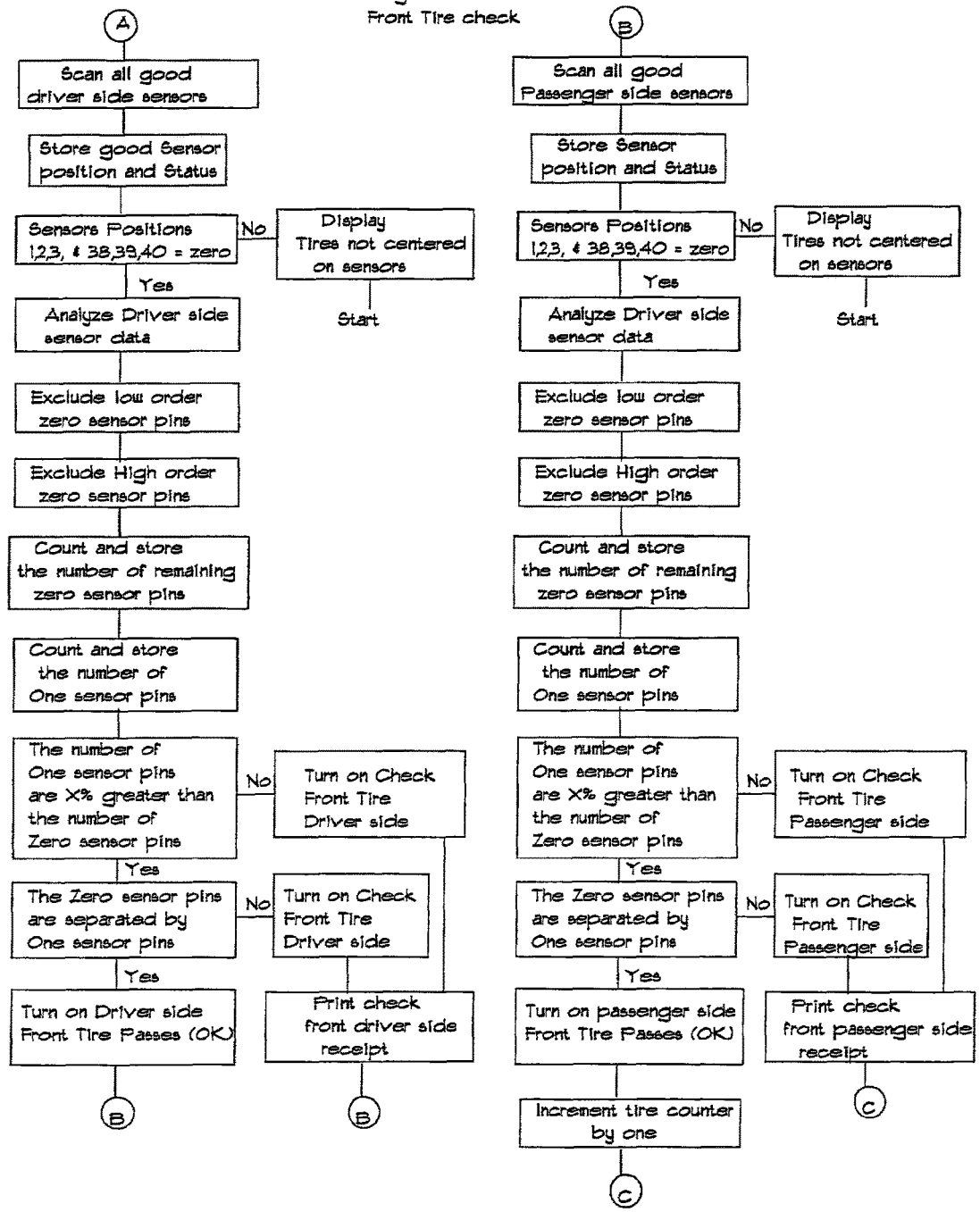
FIG. 31 is a flow chart illustrating steps and methods of an automatic front tire checking.
Figure 32:
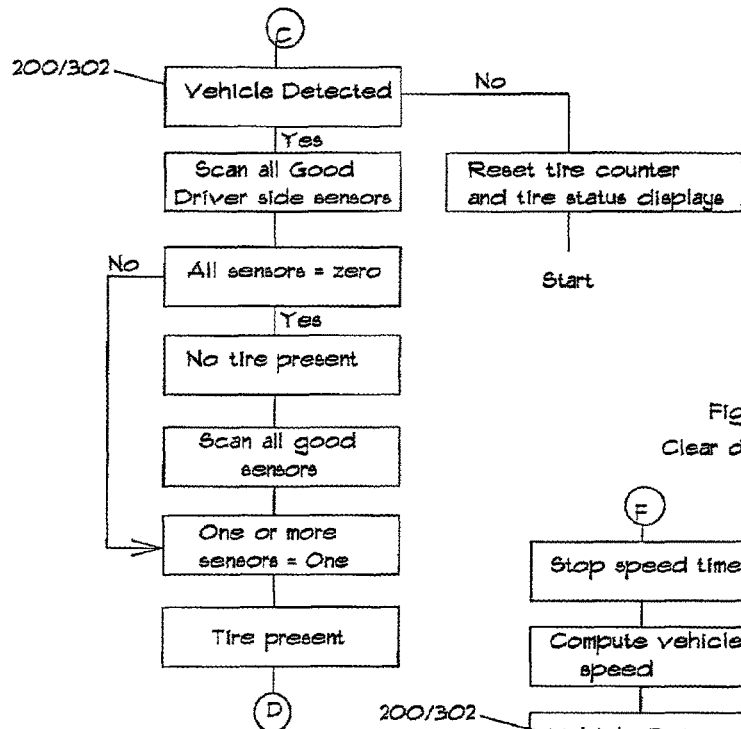
FIG. 32 is a flow chart illustrating steps and methods of an automatic rear tire detection.
Figure 33:
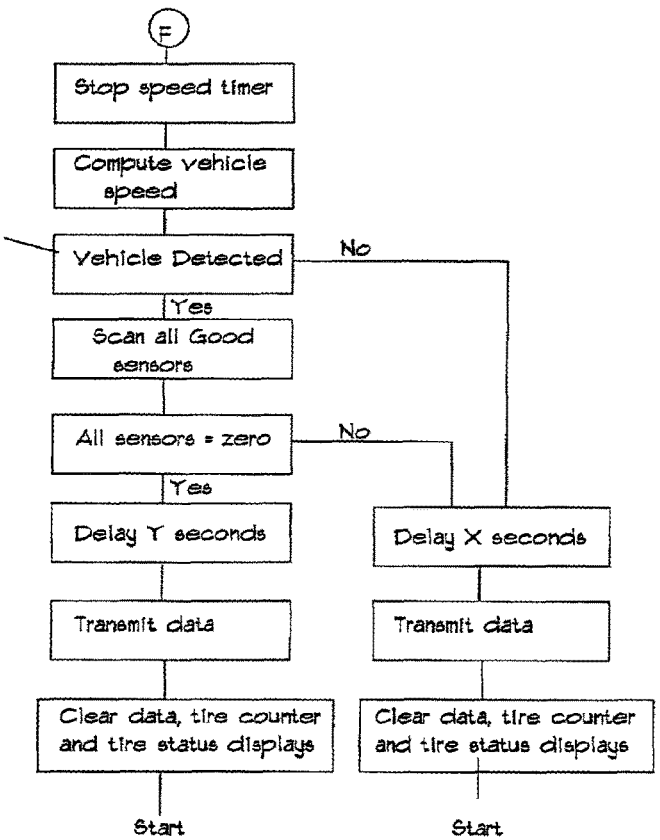
FIG. 33 is a flow chart illustrating steps and methods of transferring data and clearing tire status displays.
Figure 34:
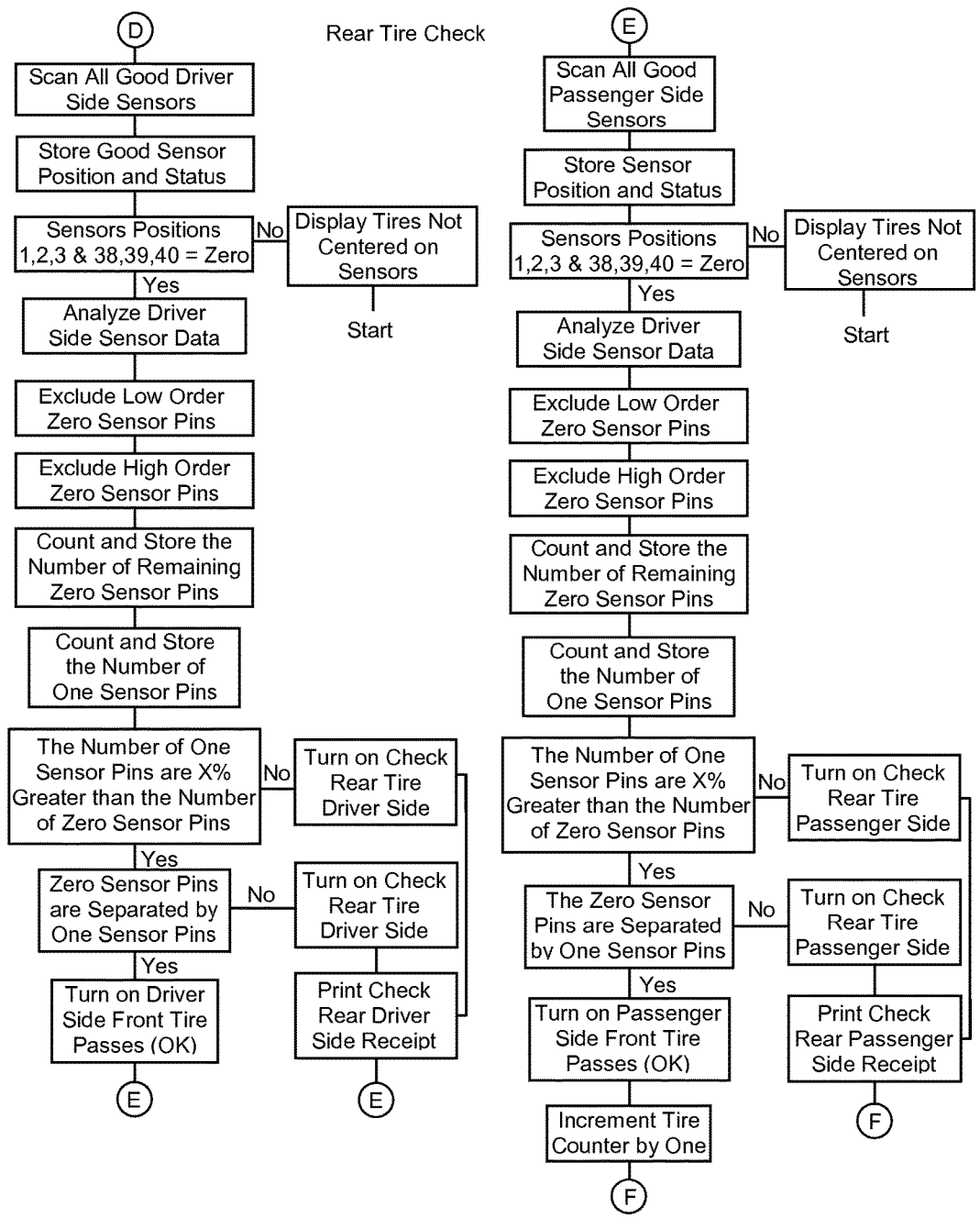
FIG. 34 is a flow chart illustrating steps and methods of an automatic rear tire checking.
Figure 35:
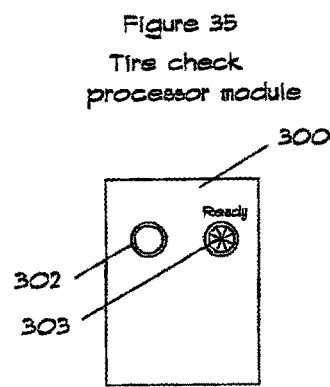
FIG. 35 is an annotated front view of a tire check processor module.

The tire check processor module 300 (FIGS. 26, 35) detects vehicles 302 in the tire check station lane 217, indicates when the tire check is in process 303, stores and analyzes pin sensor data for each vehicle tire location and transmits the tire status data 306 to the car tire status indicator module 400 (FIG. 27). The tire status data processor 301 also receives vehicle identification 305 from either the vehicle data collection terminal 500 (FIG. 28) or the vehicle identification module 508 (FIG. 29).

Figure 37:
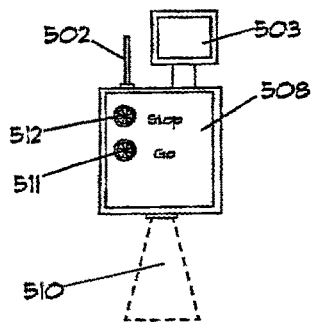
FIG. 37 is an annotated front view of a vehicle identification and control module.
Figure 38:
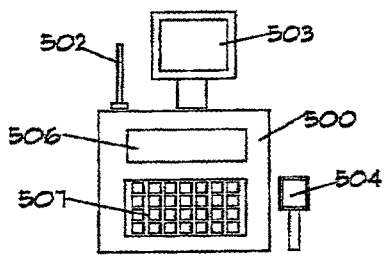
FIG. 38 is an annotated front view of a fuel island data terminal.

The tire check processor module 300 (FIGS. 26, 38) is equipped with a tire status data processor 301 a vehicle detector 302, and a ready indicator 303. The unit communicates with up to four thread depth sensor modules 307, 308, 309, 310 (FIGS. 24, 25), with a status indicator module 400, 423 (FIG. 28), a vehicle data collection terminal 500 (FIGS. 28, 38) or a vehicle identification module 508 (FIGS. 29, 37), and with network communications 304.

Figure 36:
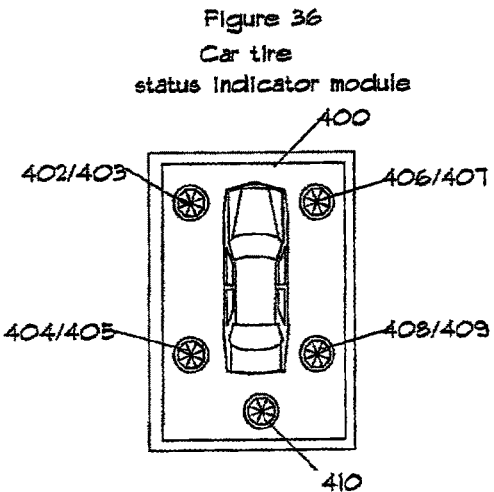
FIG. 36 is an annotated front view of a car tire status module.

The car tire status indicator module 400 (FIGS. 27, 36) is equipped with a tire status indicator processor 401, a vehicle misalignment indicator 410, four pass or check tire visual indicators and one communication port 424.

The fuel island data terminal 500 (FIGS. 28, 38) is equipped with vehicle data collection processor 501, a display 506, a key board 507, tire check module communications 519, and will support an RF transceiver 502, an RFID reader 203, a barcode reader 504, and a receipt printer 505. The tire check receipt printer 505 (FIG. 28, 40) is equipped with a receipt and barcode printer.

The vehicle identification module 508 (FIG. 29, 37) is equipped with a vehicle identification processor 509, stop and go indicators 511, 512, tire check module communications 519, and will support an RF transceiver 502, an RFID reader 203, and a barcode reader 504.

Figure 39:
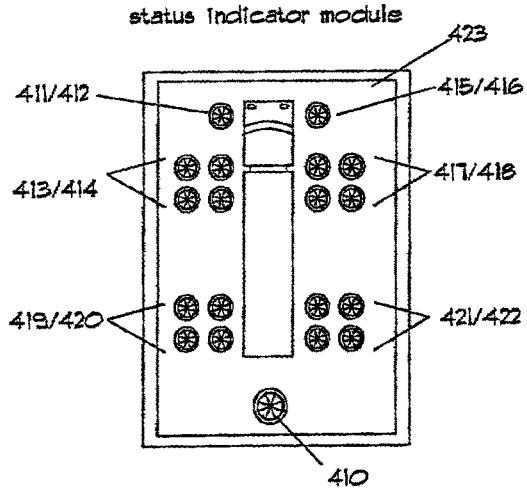
FIG. 39 is an annotated front view of a truck tire status module.
Figure 40:
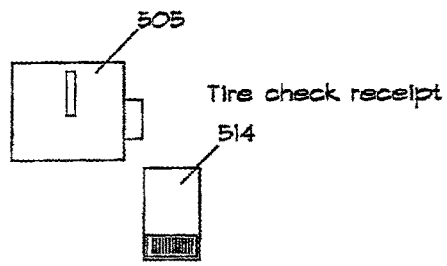
FIG. 40 is an annotated front view of a tire check status receipt printer module and barcoded receipt.

The truck tire status indicator module 423 (FIG. 39) is equipped with a tire status indicator processor 401, a vehicle misalignment indicator 410, eighteen pass or check tire visual indicators and one communication port 424.

Figure 15:
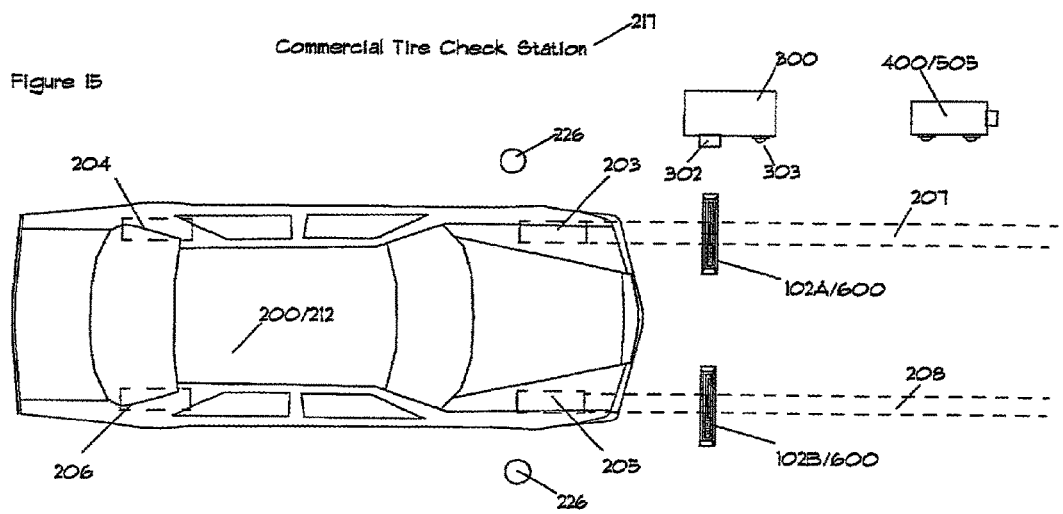
FIG. 15 is an annotated plan view of a vehicle approaching a tire check station.
Figure 16:
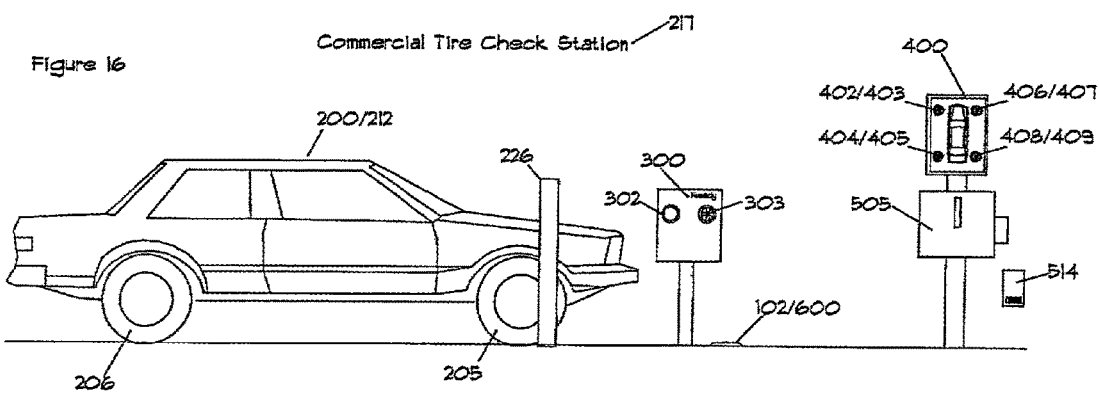
FIG. 16 is an annotated side view of a vehicle approaching a tire check station.

The automated commercial tire check station 217 (FIGS. 15, 16) comprises two single or dual thread depth sensor modules 100, one tire check processor module 300, one car tire status indicator module 400, one receipt printer 505, and two vehicle guideposts 226.

When the ready indicator 303 located on the tire check processor module 300 is lit, the vehicle 200, 212 is driven between the two vehicle guideposts 226 and over two thread depth sensor modules 102A, 102B. When the vehicle 200 is sensed by the vehicle detector 302, a sensor pin test is performed on each of the thread depth sensor modules 102A, 102B to determine if there are any defective sensor pins 103. Defective sensor pins 103 will not be used in the tire check process. When tires 103, 105 pass over the dual thread depth sensors 102A and 102B, the scanning processors 117 located in each thread depth sensor module 100 will sample, store and transmit each sensor pin status and location to the tire check processor module 300.

When the vehicle and tires 203, 205 are not centered on the sensor modules 102A, 102B, the misalignment indicator light 410 located on the car tire status indicator module 400 will be lit, instructing the vehicle driver to repeat the tire test. When the tires 203, 205 are centered over the dual thread depth sensors 102A and 102B, the sensor pins 103 status and position are analyzed by the tire status data processor 301 to determine if the tire groove depths are deep enough to ensure safe operations. When vehicle tires 203, 205 exit the sensor modules 102A, 102B, the results are transmitted to the tire status indicator module 400 and displayed using status indicator lights 402, 403 and 406, 407. Status indicators 402, 406 are lit green when the front tires pass the test. Status indicators 403, 407 are lit red when the front tires fail the test.

When the vehicle detector 302 continues to sense the presence of vehicle 200 and the pin sensor modules 102A, 102B senses a second set of vehicle tires 204, 206, they are identified as rear tires 204, 206. The same tire check test is performed on the rear tires and the results are also displayed on the status indicator module 400 using indicator lights 404, 405, 408 and 409. The test results are also sent to the receipt printer 505 and a barcoded receipt 514 is printed for the vehicle 200. The receipt 514 contains the tire status, date, time and location of the tire check. Also printed are coupons and advertisements for new tires.

Figure 41:
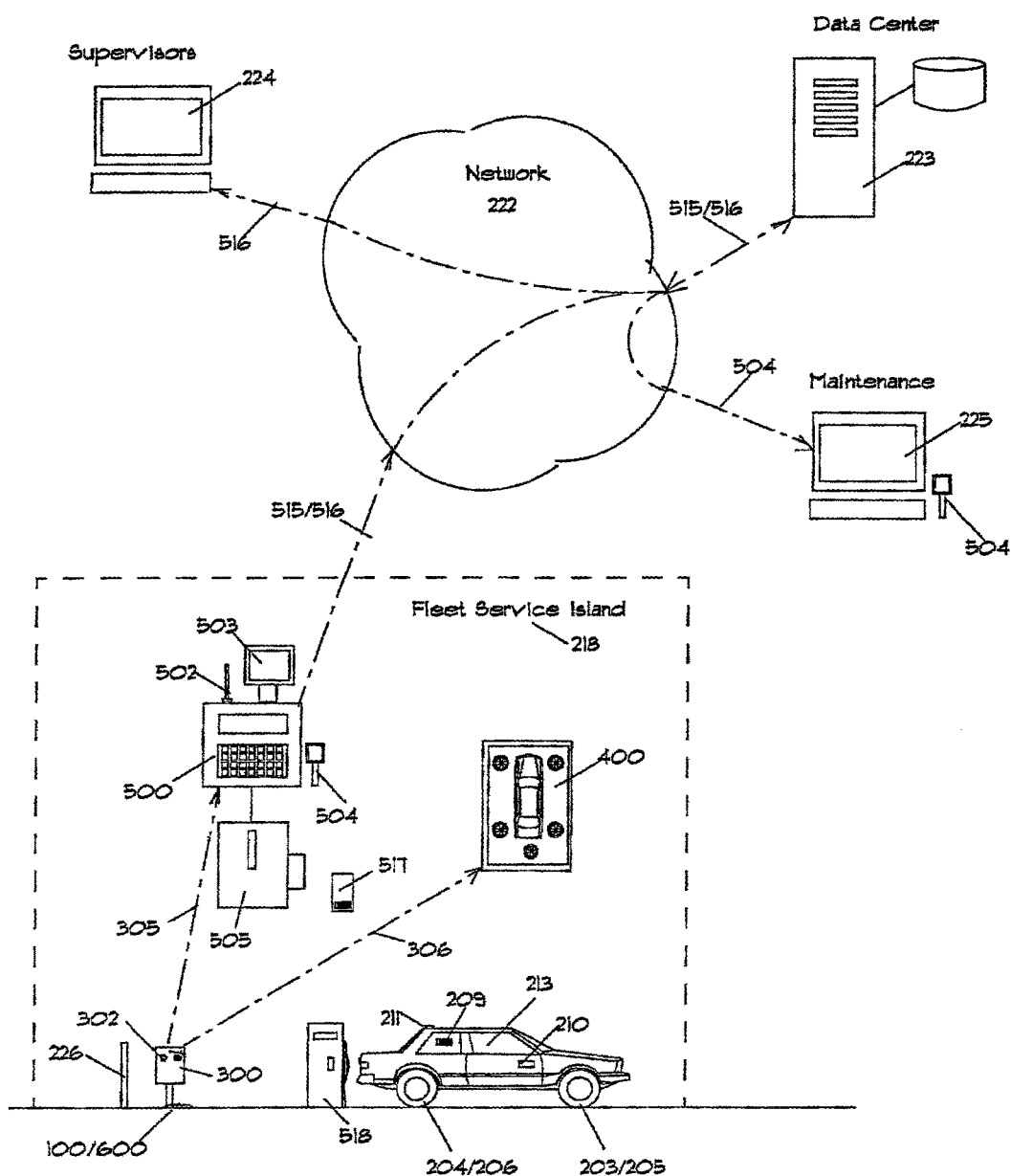
FIG. 41 is an annotated block diagram of a fleet vehicle tire checking station.

The automated fleet vehicle tire check system 218 (FIG. 41) comprises two single or dual thread depth sensor modules 100, one tire check processor module 300, one car tire status indicator module 400, one receipt printer 505, and two vehicle guideposts 226.

When a fleet vehicle 213 returns to fleet service island 218 to refuel using fuel dispenser 518, the vehicle 213 is identified by either a barcode label 209, an RFID tag 211 or a vehicle OBDM transceiver 210 as the vehicle is driven between the two vehicle guideposts 226 and over two thread depth sensor modules 100. When the vehicle 200 is sensed by the vehicle detector 302, a sensor pin test is performed on each of the thread depth sensor modules 102A, 102B to determine if there any defective sensor pins 103. Defective sensor pins 103 will not be used in the tire check process. When tires 103, 105 pass over the dual thread depth sensors 102A and 102B, the scanning processors 117 located in each thread depth sensor module 100 will sample, store and transmit each sensor pin status and location to the tire check processor module 300. If the vehicle 213 and tires 203, 205 are not centered on the sensor modules 102A, 102B, the misalignment indicator light 410 located on the car tire status indicator module 400 will be lit, instructing the vehicle driver to repeat the tire test. If the tires 203, 205 are centered over the dual thread depth sensors 102A and 102B, the sensor pins 103, status and position are analyzed by the tire status data processor 301 to determine if the tire groove depths are deep enough to ensure safe operation. When the vehicle tires 203, 205 exit the sensor modules 102A, 102B, the results are transmitted to the vehicle data collection terminal 500 and tire status indicator module 400 and displayed using status indicator lights 402, 403 and 406, 407. Status indicators 402, 406 are lit green when the front tires pass the test. Status indicators 403, 407 are lit red when the front tires fail the test.

When the vehicle detector 302 continues to sense the presence of vehicle 213 and the pin sensor modules 100 sense a second set of vehicle tires 204, 206, they are identified as rear tires 204, 206. The same tire check test is performed on the rear tires and the results are also transmitted to the vehicle data collection terminal 500 displayed on the status indicator module 400, using indicator lights 404, 405 and 408, 409. The test results are sent to the receipt printer 505 and a barcoded receipt 514 is printed for the vehicle 213. The receipt contains the tire status, date, time and location of the tire check. In addition to other data important to vehicle 213, this data 515, 516 is also sent via a local area network 222 to the data center computer 223 for storage and processing. Tire status messages 504 and 516 are also sent to the maintenance department terminal 225 and to the supervisor terminal 224.

Figure 42:
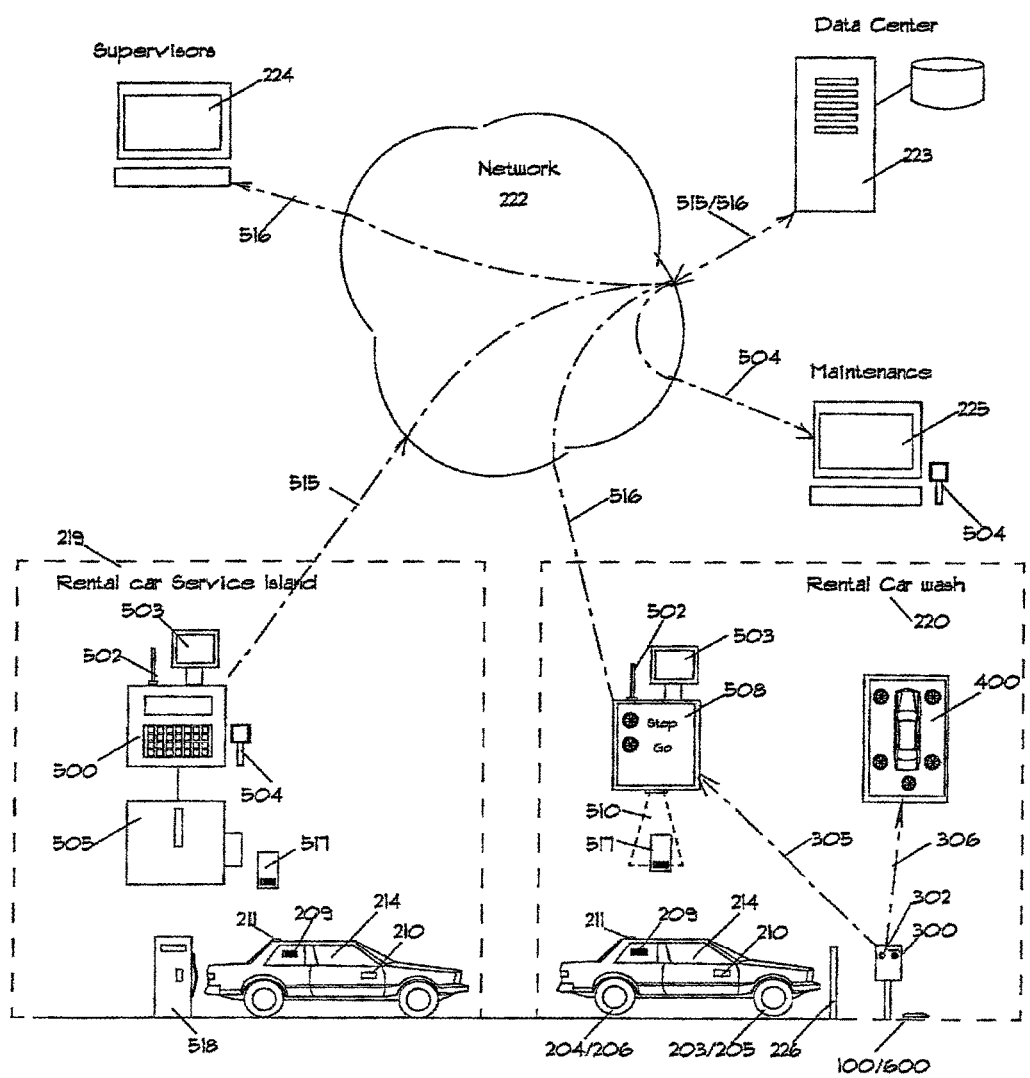
FIG. 42 is an annotated block diagram of a rental vehicle tire checking station.

The automated rental vehicle tire check station 213 (FIG. 42) comprises two single or dual thread depth sensor modules 100, one tire check processor module 300, one car tire status indicator module 400, one vehicle identification module 508, one vehicle data collection terminal 500, one receipt printer 505, and two vehicle guideposts 226.

When a rental vehicle 214 returns to rental car service island 219 to refuel using fuel dispenser 518, the vehicle 214 is identified by a barcode label 209, an RFID tag 211 or a vehicle OBDM transceiver 210. When the service is completed, a barcoded receipt 517 is printed by the receipt printer 505 and placed in the vehicle 214. The vehicle 214 then proceeds to the rental car wash station 220.

When the vehicle 214 enters the car wash station 220, it is identified by scanning the barcode on receipt 517 with the barcode scanner 510 mounted on the vehicle identification module 508. The vehicle may also be identified by the RFID tag 211 or the OBDM transceiver 210.

When the vehicle 214 passes through the vehicle guideposts 226, it is sensed by the vehicle detector 302, located on the tire check processor module 300, which initiates a sensor pin test. The test is performed on each of the thread depth sensor pins 103 in each of the modules 102A, 102B to determine if there any defective sensor pins 103. Defective sensor pins 103 will not be used in the tire check process. When tires 103, 105 pass over the dual thread depth sensors 102A and 102B, the scanning processors 117 located in each thread depth sensor module 100 will sample, store and transmit each sensor pin status and location to the tire check processor module 300.

If the tires 203, 205 of vehicle 213 are not centered on the sensor modules 102A, 102B, the misalignment indicator light 410 located on the car tire status indicator module 400 will be lit, instructing the vehicle driver to repeat the tire test. If the tires 203, 205 are centered over the dual thread depth sensors 102A and 102B, the sensor pins 103 status and position are analyzed by the tire status data processor 301 to determine if the tire groove depths are deep enough to ensure safe operation. When vehicle tires 203, 205 exit the sensor modules 102A, 102B, the results are transmitted to the vehicle identification module 508 and the tire status indicator module 400. The tire status will be displayed using status indicator lights 402, 403 and 406, 407. Status indicators 402,

406 are lit green when the front tires pass the test. Status indicators 403, 407 are lit red when the front tires fail the test.

When the vehicle detector 302 continues to sense the presence of vehicle 214 and the pin sensor modules 100 sense a second set of vehicle tires 204, 206, they are identified as rear tires 204, 206. The same tire check test is performed on the rear tires and the results are also transmitted to the vehicle identification module 508 and the tire status indicator module 400. The tire status will be displayed on the status indicator module 400 using indicator lights 404, 405 and 408, 409.

When the vehicle 214 exits the car wash station 220, the test results 516 are sent to the data center computer 223 via the vehicle identification module 508. The message contains the vehicle identification, tire status, date, time and location of the tire check. This data 515 is also sent via a local area network 222 to the data center computer 223, for further processing. Tire status messages 504 are also sent to the maintenance department terminal 225 and tire status messages 516 are sent to the supervisor terminal 224.

Figure 43:
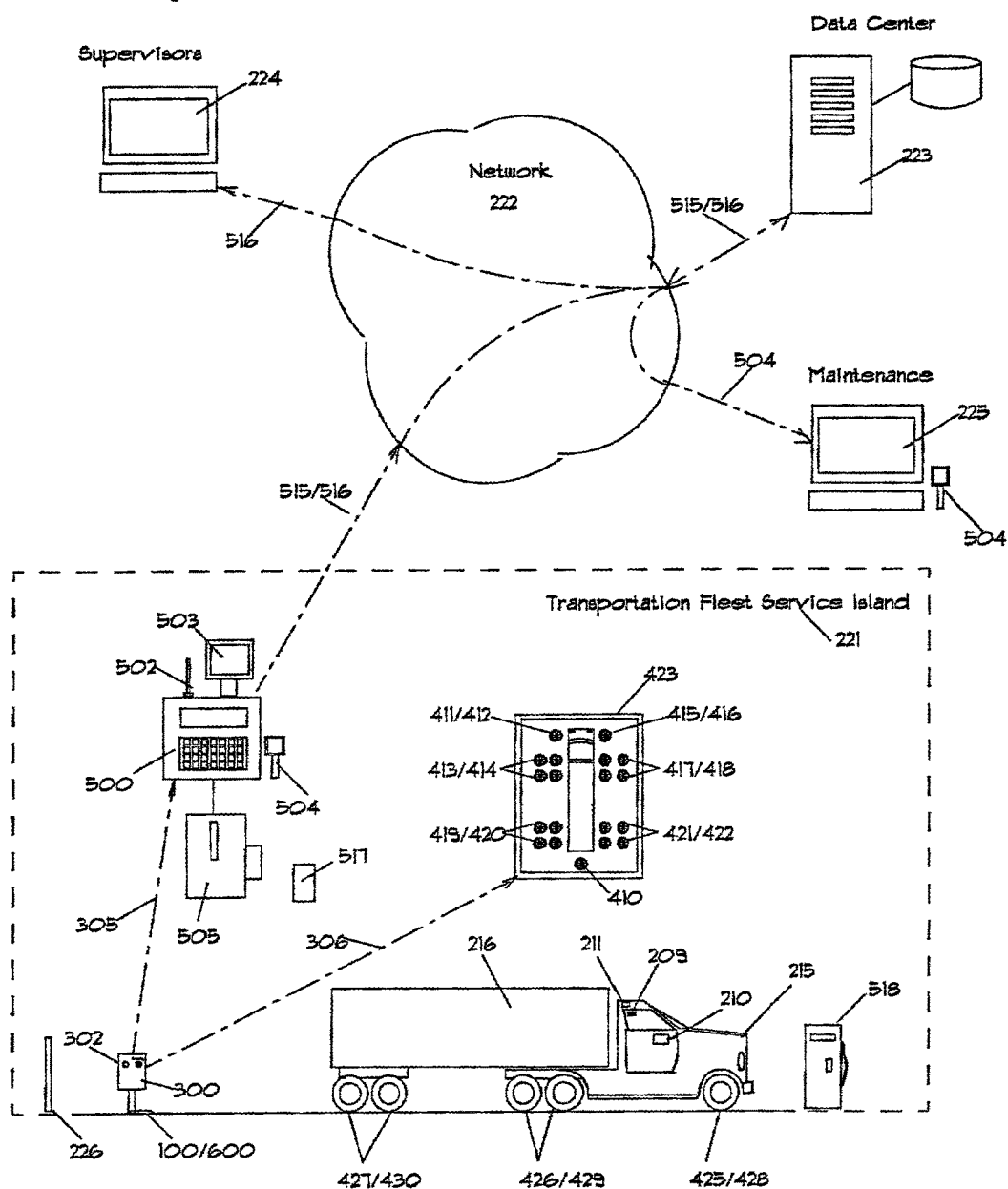
FIG. 43 is an annotated block diagram of a transportation truck tire checking station.

The automated transport truck tire check station 221 (FIG. 43) comprises two single or dual thread depth sensor modules 100, one tire check processor module 300, one truck tire status indicator module 423, one vehicle data collection terminal 500, one receipt printer 505, and two vehicle guideposts 226.

When a transport truck 221 returns to service island 221 to refuel using fuel dispenser 518, the vehicle 221 is identified by a barcode label 209, an RFID tag 211 or a vehicle OBDM transceiver 210. When the transport truck 215 enters the service island 221, it is driven between the two vehicle guideposts 226 and over two thread depth sensor modules 100. When the vehicle 215 is sensed by the vehicle detector 302, a sensor pin test is performed on each thread depth sensor pin 103, to determine if there any defective sensor pins 103. Defective sensor pins 103 will not be used in the tire check process. When tires 103, 105 pass over the dual thread depth sensors 102A and 102B, the scanning processors 117 located in each thread depth sensor module 100 will sample, store and transmit each sensor pin status and location to the tire check processor module 300. If the tires 203, 205 of vehicle 213 are not centered on the sensor modules 102A, 102B, the misalignment indicator light 410 located on the truck tire status indicator module 400 will be lit, instructing the vehicle driver to repeat the tire test. If the front tires 425, 428 are centered over the dual thread depth sensors 102A and 102B, the sensor pins 103 status and position are analyzed by the tire status data processor 301 to determine if the tire groove depths are deep enough to ensure safe operations. When truck tires 425, 428 exit the sensor modules 102A, 102B, the results are transmitted to the vehicle data collection terminal 500 and tire status indicator module 423 are displayed using status indicator lights 411, 412 and 415, 416. Status indicators 411, 415 are lit green if the front tires pass the test. Status indicators 412, 416 are lit red if the front tires fail the test.

When the vehicle detector 302 continues to sense the presence of vehicle 215 and the pin sensor modules 100 sense a second set of vehicle tires 426, 429, they are identified as cab rear tires. The same tire check test is performed on the cab rear tires and the results are also transmitted to the vehicle data collection terminal 500 and displayed on the status indicator module 423 using indicator lights 417, 418 and 413, 414.

When the vehicle detector 302 continues to sense the presence of vehicle 215 and the pin sensor modules 100 sense a third set of vehicle tires 427, 430, they are identified as trailer tires. The same tire check test is performed on the trailer tires and the results are also transmitted to the vehicle data collection terminal 500 and displayed on status indicator module 423 using indicator lights 419, 420 and 421, 422.

The test results 305 are sent from the tire check processor module 300 to the vehicle data collection terminal 500 and the receipt printer 505 and a barcoded receipt 517 is printed for the vehicle 215 containing the tire status, date, time and location of the tire check. In addition to other data important to vehicle 215, this data 515, 516 is also sent via a local area network 222 to the data center computer 223 for storage and further processing. Tire status messages 504 are also sent to the maintenance department terminal 225 and tire status messages 516 are sent to the supervisor terminal 224.

The invention claimed is:

1. A tire evaluation station for automatically determining the tire wear characteristics of a vehicle having a driver side front tire and a rear tire and a passenger side front tire and a rear tire wherein each said tire has a width, comprising:
a travel lane;
a first sensor module and a second sensor module disposed transversely across said travel lane;
each said sensor module consisting of an array of spring loaded pins which are linearly aligned and generally equidistantly spaced and extend from a low order pin to a high order pin and extend a width greater than the width of each tire from a low order pin to a high order pin and comprising circuitry for determining the vertical position of each of said pins and transmitting data indicative thereof, the array of aligned spring loaded pins of said first sensor module being linearly aligned with the spring loaded pins of said second sensor module;
a processor receiving said data from each said sensor module at different time sequences and processing said data from said first sensor module and said second sensor module and serially generating as appropriate a tire wear indicator output and employing high and low order pins to for determining that there is a tire/sensor module misalignment and generating an evaluation misalignment output; and
a display module responsive to said indicator output and said misalignment output and serially operatable as appropriate to display a tire wear characteristic and an evaluation misalignment indication,
so that a vehicle approaching and driving over said first and second sensor modules serially produces as appropriate a display at said display module of tire wear characteristics for each of said front and rear tires on said driver and passenger sides of said vehicle and an evaluation misalignment indication.

2. The tire evaluation station of claim 1 wherein each sensor module comprises multiple pins that protrude from a pin guide block to define a protruding height which is equal to a recommended groove depth for safe tire operation.

3. The tire evaluation station of claim 2 wherein a sensor pin has a shaft and a contact surface that is wider than the pin shaft.

4. The tire evaluation station of claim 3 further comprising a second contact surface which mates with a pin sensor contact surface.

5. The tire evaluation station of claim 4 wherein each sensor pin has a conducting spring that applies pressure to a bottom portion of the sensor pin and is held in place by a grounding bar.

6. The tire evaluation station of claim 1 wherein said display module comprises one or more status lights for each tire and wherein a green light indicates a good tire and a red light indicates that the tire should be inspected visually.

7. The tire evaluation station of claim 1 wherein said display module issues information concerning a tire checking station location, date and time, each tire location and status, and issues a coupon, an advertisement, and a barcoded receipt number.

8. The tire evaluation station of claim 1 further comprising a groove cleaning station which automatically ejects air toward a tire in the vicinity of a sensor module.

9. The tire evaluation station of claim 8 wherein the groove cleaning station comprises an air bladder and air bladder plunger spaced rearwardly of said sensor module and disposed in said travel lane.

10. A tire evaluation station for automatically determining the tire wear characteristics of a vehicle having a driver side front tire and a rear tire and a passenger side front tire and a rear tire wherein each said tire has a width, comprising:
a travel lane;
a first sensor module and a second sensor module disposed transversely across said travel lane;
each said sensor module consisting of an array of spring loaded pins which are linearly aligned and generally equidistantly spaced and extend from a low order pin to a high order pin and extend a width greater than the width of each tire from a low order pin to a high order pin and comprising circuitry for determining the vertical position of each of said pins and transmitting data indicative thereof, the array of aligned spring loaded pins of said first sensor module being linearly aligned with the spring loaded pins of said second sensor module;
a processor receiving said data from each said sensor module at different time sequences and processing said data from said first sensor module and said second sensor module and including employing data from each said high order pin and each said low order pin to determine whether there is a tire/sensor module misalignment and, if so, generating an evaluation misalignment output; and
a display module responsive to said evaluation misalignment output to display an evaluation misalignment indication,
so that a vehicle approaching and driving over said first and second sensor modules produces as appropriate a display at said display module of an evaluation misalignment indication in the event that there is a tire/sensor module misalignment.

11. The tire evaluation system of claim 10 further comprising a vehicle detector module which determines that a vehicle is present by using a sensor selected from the group consisting of a magnetic sensor, an optical sensor, a contact closure, and an ultrasonic sensor.

12. The tire evaluation system of claim 10 wherein said display module has a network interface that transmits a tire checking station location, date and time, each tire location and status, and a receipt number.

13. The tire evaluation system of claim 10 further comprising a cleaning module which automatically cleans a tire tread.

14. The tire evaluation station of claim 10 wherein said processor further comprises processing said data from each said first sensor module and said second sensor module and generating a tire wear indicator output.

15. A tire evaluation station for automatically determining the tire wear characteristics of a vehicle having a driver side front tire and a rear tire and a passenger side front tire and a rear tire wherein each said tire has a width, comprising:
a travel lane;
a first sensor module and a second sensor module disposed transversely across said travel lane;
each said sensor module comprising an array of spring loaded pins which are linearly aligned and extend a width greater than the width of each tire from a low order pin to a high order pin and circuitry for determining the vertical position of each of said pins and transmitting data indicative thereof;
a processor receiving said data from each said sensor module at different time sequences and processing said data from said first sensor module and said second sensor module and serially generating as appropriate a tire wear indicator output and employing high and low order pins for determining that there is a tire/sensor module misalignment and generating an evaluation misalignment output;
a display module responsive to said indicator output and said misalignment output and serially operable as appropriate to display a tire wear characteristic and an evaluation misalignment indication; and
a groove cleaning station which automatically ejects air toward a tire in the vicinity of a sensor module wherein the groove cleaning station comprises an air bladder and air bladder plunger spaced rearwardly of said sensor module and disposed in said travel lane,
so that a vehicle approaching and driving over said first and second sensor modules serially produces as appropriate a display at said display module of tire wear characteristics for each of said front and rear tires on said driver and passenger sides of said vehicle and an evaluation misalignment indication.

* * * * *